(12) United States Patent
Sato et al.

(10) Patent No.: US 10,808,134 B2
(45) Date of Patent: Oct. 20, 2020

(54) PHOTO-CURABLE INK COMPOSITION AND METHOD FOR FORMING IMAGE

(71) Applicant: FUJIFILM CORPORATION, Minato-ku, Tokyo (JP)

(72) Inventors: Noriaki Sato, Kanagawa (JP); Ichiro Koyama, Kanagawa (JP); Shota Suzuki, Kanagawa (JP); Yasuhiro Sawamura, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/543,624

(22) Filed: Aug. 19, 2019

(65) Prior Publication Data

US 2019/0382603 A1 Dec. 19, 2019

Related U.S. Application Data

(63) Continuation of application No. PCT/JP2018/004068, filed on Feb. 6, 2018.

(30) Foreign Application Priority Data

Feb. 24, 2017 (JP) ................. 2017-033902

(51) Int. Cl.
*B41J 11/00* (2006.01)
*B41M 5/00* (2006.01)
(Continued)

(52) U.S. Cl.
CPC ............... *C09D 11/101* (2013.01); *B41J 2/01* (2013.01); *B41J 11/002* (2013.01);
(Continued)

(58) Field of Classification Search
CPC . B41J 2/01; B41J 11/002; B41M 5/00; B41M 5/0023; C09D 11/101; C09D 11/107; C09D 11/30; C08F 265/00
See application file for complete search history.

(56) References Cited

U.S. PATENT DOCUMENTS

2006/0189715 A1* 8/2006 Ishibashi .............. C09D 11/101
523/160
2007/0173560 A1* 7/2007 Uozumi .................. C09D 11/36
523/160
(Continued)

FOREIGN PATENT DOCUMENTS

EP 2088177 A2 8/2009
EP 2489708 A1 8/2012
(Continued)

OTHER PUBLICATIONS

International Search Report issued in International Application No. PCT/JP2018/004068 dated Mar. 27, 2018.
(Continued)

*Primary Examiner* — Anh T Vo
(74) *Attorney, Agent, or Firm* — Solaris Intellectual Property Group, PLLC

(57) ABSTRACT

A photo-curable ink composition contains an amine resin including a constituent unit A represented by a formula (1) or a formula (2) and a constituent unit B represented by any of a formula (3) to a formula (7) and a radical-polymerizable monomer. In the radical-polymerizable monomer, a content of a radical-polymerizable monomer having an acid group is 1.5 mmol or less per 100 g of the photo-curable ink composition. A method for forming an image using the photo-curable ink composition is also provided.

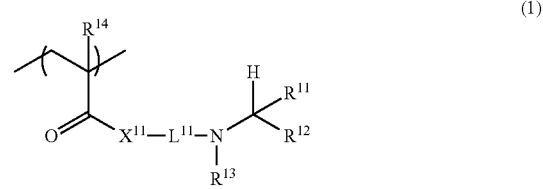

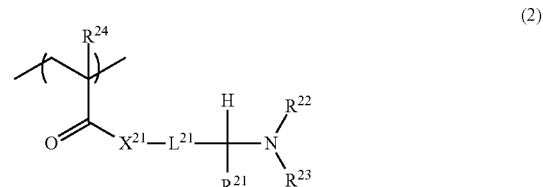

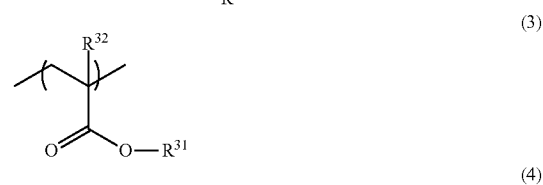

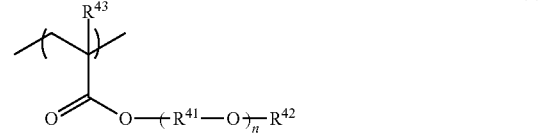

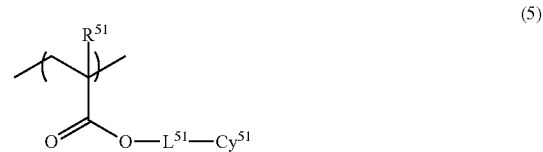

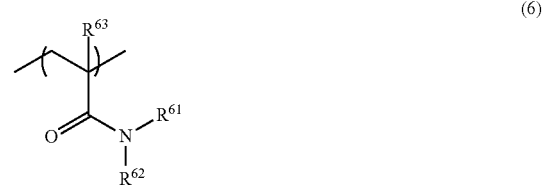

(Continued)

-continued

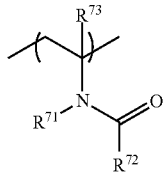
(7)

12 Claims, No Drawings

(51) Int. Cl.
C09D 11/101 (2014.01)
C09D 11/107 (2014.01)
C09D 11/30 (2014.01)
B41J 2/01 (2006.01)

(52) U.S. Cl.
CPC ......... B41M 5/0023 (2013.01); C09D 11/107 (2013.01); C09D 11/30 (2013.01)

(56) References Cited

U.S. PATENT DOCUMENTS

2009/0197056 A1  8/2009  Yokoi et al.
2010/0243304 A1*  9/2010  Otsuki ............... C08G 59/1466
                                                         174/258
2011/0045257 A1  2/2011  Arai et al.

FOREIGN PATENT DOCUMENTS

| EP | 2832803 A | 2/2015 |
| EP | 3342792 A | 7/2018 |
| JP | H05-142773 A | 6/1993 |
| JP | 2006-241193 A | 9/2006 |
| JP | 2008-050589 A | 3/2008 |
| JP | 2009-139852 A | 6/2009 |
| JP | 2009-209352 A | 9/2009 |
| JP | 2010-085553 A | 4/2010 |
| JP | 2010-270261 A | 12/2010 |
| JP | 2011-042699 A | 3/2011 |
| JP | 2011-225848 A | 11/2011 |
| JP | 2012-184404 A | 9/2012 |
| JP | 2013-203844 A | 10/2013 |
| WO | 2017/033984 A1 | 3/2017 |

OTHER PUBLICATIONS

Written Opinion of the ISA issued in International Application No. PCT/JP2018/004068 dated Mar. 27, 2018.
Extended European Search Report dated Feb. 5, 2020, issued in corresponding EP Patent Application No. 18757225.0.
English language translation of the following: Office action dated Jul. 21, 2020, from the JPO in a Japanese patent application No. 2019-501197 corresponding to the instant patent application.

* cited by examiner

PHOTO-CURABLE INK COMPOSITION AND METHOD FOR FORMING IMAGE

CROSS-REFERENCE TO RELATED APPLICATIONS

This application is a continuation of International Application No. PCT/JP2018/004068, filed Feb. 6, 2018, the disclosure of which is incorporated herein by reference in its entirety. Further, this application claims priority from Japanese Patent Application No. 2017-033902, filed Feb. 24, 2017, the disclosure of which is incorporated herein by reference in its entirety.

BACKGROUND OF THE INVENTION

1. Field of the Invention

The present disclosure relates to a photo-curable ink composition and a method for forming an image.

2. Description of the Related Art

Examples of an image recording method for forming an image on a recording medium such as paper or a plastic on the basis of image data signals include an electrophotographic system, dye-sublimation-type and fusion-type thermal transfer systems, a screen printing system, and ink jet system.

Examples of known photo-curable ink compositions include those described in JP2011-225848A, JP2009-139852A, JP1993-142773A (JP-H05-142773A), JP2009-209352A, and JP2010-85553A.

In the ink jet system, printing apparatuses are cheap, a printing block is not required during printing, and an ink composition is ejected only on a necessary image portion to form an image directly on a recording medium. Accordingly, the ink composition can be efficiently used, and the operating cost is low particularly in the case of a small-lot production. Furthermore, the ink jet system is unlikely to generate noise and is good as an image recording system. Thus, the ink jet system has attracted attention in recent years.

An example of a known ink composition that has good ejection stability even after long-term storage and high sensitivity and that is cured to provide an image having good flexibility, good adhesion to a recording medium, and a high surface hardness is an active radiation-curable ink composition including (A) a polymer having two or more acidic groups or two or more basic groups, (B) a polymerizable monomer having a substituent capable of forming a counter salt with the acidic groups or the basic groups of the polymer, (C) a photopolymerization initiator, and (D) a polymerizable monomer having a structure different from a structure of the (B) polymerizable monomer (refer to, for example, JP2011-225848A).

A known planographic printing plate precursor that can be developed in an acidic to neutral range and that overcomes a problem of developability during the development, and furthermore, a problem of dispersion stability of a protective layer component (development residue) removed by the development is a planographic printing plate precursor including, on a hydrophilic support, a photosensitive layer that contains (A) a sensitizing dye, (B) a polymerization initiator, (C) a polymerizable compound, and (D) a binder polymer, and a protective layer containing at least one acid-modified polyvinyl alcohol in an amount of 50% by mass or more relative to a total solid content of the protective layer in this order, in which the protective layer and a non-exposed portion of the photosensitive layer can be removed with a developer having a pH of 2 to 8 (refer to, for example, JP2009-139852A).

A known photopolymerizable resin composition that is sensitive to light having a wavelength in the range of 300 to 600 nm and including visible light with high sensitivity contains a vinyl polymer containing a specific structural unit having a dialkylamino group, and an α-diketone having a specific structure (refer to, for example, JP1993-142773A (JP-H05-142773A).

A known ink composition which has good curing sensitivity and has good rubfastness and a good blocking resistance, in which stickiness of a surface is suppressed, and which can form an image having an improved surface curability contains a polymer including a partial structure selected from the group consisting of (a) a fluorine-substituted hydrocarbon group, a siloxane skeleton, and a long-chain alkyl group, a radical-polymerizable group, and a tertiary amine structure (refer to, for example, JP2009-209352A).

A known dye-containing negative curable composition capable of forming a good pattern having no development residual film and residue even in a case of a fine pixel size includes (A) an organic solvent-soluble dye, (B) a photopolymerization initiator, (C) a polymerizable compound, (D) an amino group-containing alkali-soluble resin having a substituted or unsubstituted amino group in a side chain thereof, and (E) an organic solvent (refer to, for example, JP2010-85553A).

SUMMARY OF THE INVENTION

An object of an embodiment of the present invention is to provide a photo-curable ink composition capable of forming an image having good glossiness.

An object of another embodiment of the present invention is to provide a method for forming an image using the photo-curable ink composition.

Means for achieving the above objects include the following embodiments.

<1> A photo-curable ink composition containing an amine resin including a constituent unit A represented by a formula (1) or a formula (2) and a constituent unit B represented by any of a formula (3) to a formula (7); and a radical-polymerizable monomer, in which the radical-polymerizable monomer contains at least one of a monofunctional radical-polymerizable monomer or a bifunctional radical-polymerizable monomer, a total content of the monofunctional radical-polymerizable monomer and the bifunctional radical-polymerizable monomer is 50% by mass or more based on a total mass of the photo-curable ink composition, and in the radical-polymerizable monomer, a content of a radical-polymerizable monomer having an acid group is 1.5 mmol or less per 100 g of the photo-curable ink composition.

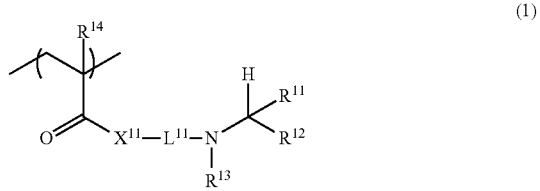

-continued

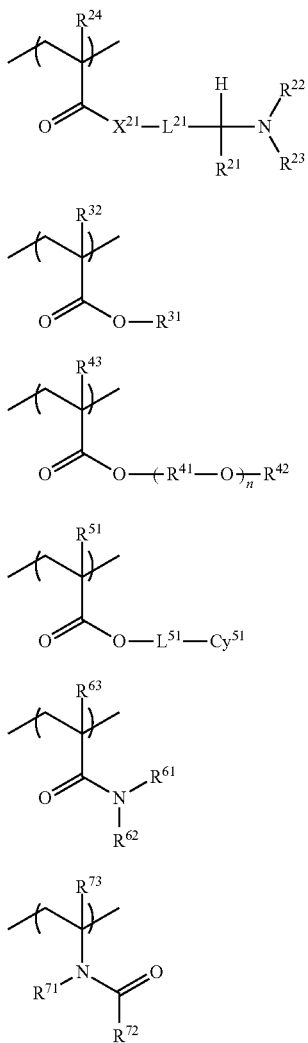

In the formula (1), $X^{11}$ represents O or $NR^{15}$, $R^{11}$ to $R^{13}$ each independently represent a hydrogen atom or a hydrocarbon group having 1 to 11 carbon atoms, $R^{14}$ represents a hydrogen atom or a hydrocarbon group having 1 to 5 carbon atoms, $L^{11}$ represents a hydrocarbon group having 1 to 11 carbon atoms, $R^{15}$ represents a hydrogen atom or a hydrocarbon group having 1 to 11 carbon atoms, $R^{13}$ and $L^{11}$ may be linked to each other to form a ring, $R^{12}$ and $R^{13}$ may be linked to each other to form a ring, and $R^{15}$ and $L^{11}$ may be linked to each other to form a ring.

In the formula (2), $X^{21}$ represents O or $NR^{25}$, $R^{21}$ to $R^{23}$ each independently represent a hydrogen atom or a hydrocarbon group having 1 to 11 carbon atoms, $R^{24}$ represents a hydrogen atom or a hydrocarbon group having 1 to 5 carbon atoms, $L^{21}$ represents a hydrocarbon group having 1 to 11 carbon atoms, $R^{25}$ represents a hydrogen atom or a hydrocarbon group having 1 to 11 carbon atoms, $R^{21}$ and $L^{21}$ may be linked to each other to form a ring, $R^{22}$ and $R^{23}$ may be linked to each other to form a ring, and $R^{25}$ and $L^{21}$ may be linked to each other to form a ring.

In the formula (3), $R^{31}$ represents a branched or unbranched hydrocarbon group having 1 to 11 carbon atoms, and $R^{32}$ represents a hydrogen atom or a hydrocarbon group having 1 to 5 carbon atoms.

In the formula (4), $R^{41}$ at each occurrence independently represents a branched or unbranched hydrocarbon group having 1 to 10 carbon atoms, $R^{42}$ represents a hydrogen atom or a branched or unbranched hydrocarbon group having 1 to 10 carbon atoms, $R^{43}$ represents a hydrogen atom or a hydrocarbon group having 1 to 5 carbon atoms, and n represents an integer of 1 to 50.

In the formula (5), $Cy^{51}$ represents a hydrocarbon group having a ring structure that has 3 to 15 carbon atoms and that may have an oxygen atom, $L^{51}$ represents a single bond or a divalent linking group, and $R^{51}$ represents a hydrogen atom or a hydrocarbon group having 1 to 5 carbon atoms.

In the formula (6), $R^{61}$ and $R^{62}$ each independently represent a hydrogen atom or a hydrocarbon group that has 1 to 11 carbon atoms and that may include an oxygen atom, $R^{61}$ and $R^{62}$ may be linked to each other to have a ring structure, and $R^{63}$ represents a hydrogen atom or a hydrocarbon group having 1 to 5 carbon atoms.

In the formula (7), $R^{71}$ and $R^{72}$ each independently represent a hydrogen atom or a hydrocarbon group having 1 to 11 carbon atoms, $R^{71}$ and $R^{72}$ may be linked to each other to have a ring structure, and $R^{73}$ represents a hydrogen atom or a hydrocarbon group having 1 to 5 carbon atoms.

<2> The photo-curable ink composition according to <1>, in which the amine resin includes an amine resin including at least one constituent unit represented by a formula (1a) or a formula (2b) as the constituent unit A and at least one constituent unit represented by the formula (3) or the formula (4) as the constituent unit B or an amine resin including a constituent unit represented by a formula (1c) as the constituent unit A and a constituent unit represented by any of the formula (5) to the formula (7) as the constituent unit B.

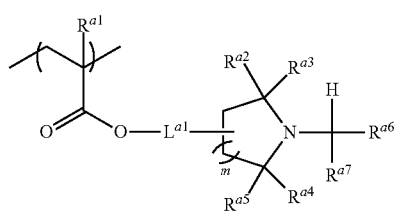

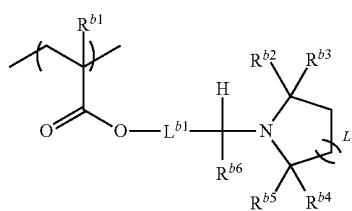

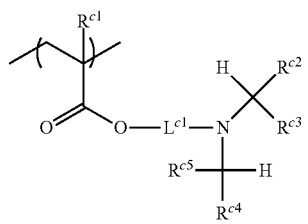

In the formula (1a), $R^{a1}$ represents a hydrogen atom or a methyl group, $L^{a1}$ represents a single bond or a divalent hydrocarbon group having 1 to 11 carbon atoms, $R^{a2}$ to $R^{a5}$ each independently represent a hydrogen atom or a hydrocarbon group having 1 to 3 carbon atoms, $R^{a6}$ and $R^{a7}$ each independently represent a hydrogen atom or a hydrocarbon group having 1 to 10 carbon atoms, and m represents 1 or 2.

In the formula (2b), $R^{b1}$ represents a hydrogen atom or a methyl group, $L^{b1}$ represents a single bond or a divalent hydrocarbon group having 1 to 11 carbon atoms, $R^{b2}$ to $R^{b5}$ each independently represent a hydrogen atom or a hydrocarbon group having 1 to 3 carbon atoms, $R^{b6}$ represents a hydrogen atom or a hydrocarbon group having 1 to 10 carbon atoms, and L represents 1 or 2.

In the formula (1c), $R^{c1}$ represents a hydrogen atom or a methyl group, $L^{c1}$ represents a divalent hydrocarbon group having 1 to 11 carbon atoms, and $R^{c2}$ to $R^{c5}$ each independently represent a hydrogen atom or a hydrocarbon group having 1 to 10 carbon atoms.

<3> The photo-curable ink composition according to <1> or <2>, in which the amine resin includes an amine resin including a constituent unit represented by a formula (1d) as the constituent unit A and at least one constituent unit represented by the formula (3) or the formula (4) as the constituent unit B.

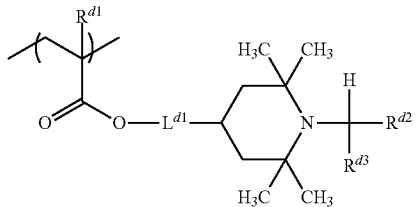
(1d)

In the formula (1d), $R^{d1}$ represents a hydrogen atom or a methyl group, $L^{d1}$ represents a single bond or a divalent hydrocarbon group having 1 to 11 carbon atoms, and $R^{d2}$ and $R^{d3}$ each independently represent a hydrogen atom or a hydrocarbon group having 1 to 3 carbon atoms.

<4> The photo-curable ink composition according to <2>, in which the amine resin includes an amine resin including a constituent unit represented by the formula (1c) as the constituent unit A and a constituent unit represented by the formula (5) and a constituent unit represented by the formula (6) or the formula (7) as the constituent unit B.

<5> The photo-curable ink composition according to any one of <1> to <4>, in which $Cy^{51}$ in the formula (5) represents a hydrocarbon group having a polycyclic structure having 3 to 15 carbon atoms.

<6> The photo-curable ink composition according to any one of <1> to <5>, in which, in the formula (6), $R^{61}$ and $R^{62}$ each independently represent a hydrocarbon group that has 1 to 4 carbon atoms and that may include an oxygen atom, $R^{61}$ and $R^{62}$ may be linked to each other to have a ring structure, and $R^{63}$ represents a hydrogen atom or a methyl group.

<7> The photo-curable ink composition according to any one of <1> to <6>, in which the constituent unit represented by the formula (7) is a constituent unit represented by a formula (7a) below.

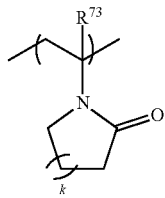
(7a)

In the formula (7a), $R^{73}$ represents a hydrogen atom or a methyl group, and k represents an integer of 1 to 3.

<8> The photo-curable ink composition according to any one of <1> to <7>, in which at least one terminal structure of the amine resin is a structure represented by a formula (8).

$$R^{81}-S-*$$ (8)

In the formula (8), $R^{81}$ represents a branched or unbranched hydrocarbon group having 8 to 20 carbon atoms, and * represents a site linked to the resin.

<9> The photo-curable ink composition according to any one of <1> to <8>, in which the radical-polymerizable monomer includes at least one monomer represented by any of a formula (9) to a formula (12).

(9)

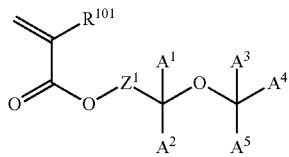
(10)

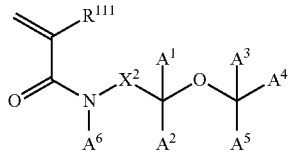
(11)

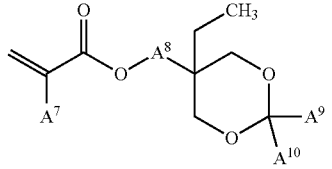
(12)

In the formula (9), $Y^1$ at each occurrence independently represents an alkylene group having 1 to 10 carbon atoms, $Y^2$ represents a single bond or a carbonyl group, and k represents an integer of 1 to 3.

In the formula (10) and the formula (11), $A^1$ to $A^6$ each independently represent a hydrogen atom, an alkyl group, an alkoxy group, or $-L^{101}-(OR^{102})_{na}-R^{103}$, $L^1$ represents a single bond or an alkylene group, $R^{101}$ represents a hydrogen atom or a methyl group, $R^{102}$ at each occurrence independently represents an alkylene group, $R^{103}$ represents a hydrogen atom or an alkoxy group, $R^1$ represents a hydrogen atom or a methyl group, nA represents an integer of 1 or more, at least one of A1 to $A^5$ represents a hydrogen atom, two of $A^1$ to $A^5$ may be bonded to each other to form a ring, and $Z^1$ and $X^2$ each independently represent an alkylene group, a group in which two or more alkylene groups are combined with one or more ether bonds, or a group in which two or more alkylene groups are combined with one or more ester bonds.

In the formula (12), $A^7$, $A^9$, and $A^{10}$ each independently represent a hydrogen atom, a methyl group, or an ethyl group, and $A^8$ represents a single bond or a divalent linking group.

<10> The photo-curable ink composition according to any one of <1> to <9>, further including a sensitizer.

<11> The photo-curable ink composition according to <10>, in which the sensitizer includes a thioxanthone compound or a benzophenone compound.

<12> The photo-curable ink composition according to any one of <1> to <11>, further including an antioxidant.

<13> The photo-curable ink composition according to <12>, in which the antioxidant includes a hindered phenol compound having a molecular weight of 1,000 or less or a hindered amine compound having a molecular weight of 1,000 or less.

<14> The photo-curable ink composition according to any one of <1> to <13>, in which the radical-polymerizable monomer having an acid group includes a radical-polymerizable monomer having a carboxy group.

<15> A method for forming an image, the method having an application step of applying the photo-curable ink composition according to any one of <1> to <14> to a recording medium by an ink jet method; and an irradiation step of irradiating the ink composition applied to the recording medium with an active energy ray.

According to an embodiment of the present invention, there is provided a photo-curable ink composition capable of forming an image having good glossiness.

According to another embodiment of the present invention, there is provided a method for forming an image using the photo-curable ink composition.

DESCRIPTION OF THE PREFERRED EMBODIMENTS

Hereafter, specific embodiments of the present disclosure will be described in detail. The present disclosure is not limited to the embodiments described below and can be carried out by adding modifications as required within the ranges of the objects of the present disclosure.

In the present specification, a range of numerical values shown by using "to" means a range including a numerical value described before "to" as a minimum and a numerical value described after "to" as a maximum.

In the present specification, when a plurality of substances corresponding to each component are present in a composition, an amount of each component in the composition means a total amount of the plurality of substances that are present in the composition unless otherwise stated.

In the present specification, the term "step" refers to not only an independent step but also a step that is not clearly distinguished from another step as long as a desired purpose of the step is achieved.

In the present specification, the term "light" covers a concept that includes active energy rays such as γ-rays, β-rays, electron beams, ultraviolet rays, visible rays, and infrared rays.

In the present specification, ultraviolet rays may be referred to as "UV (ultraviolet) light".

In the present specification, light emitted from an LED (light emitting diode) light source may be referred to as "LED light".

In the present specification, the term "(meth)acrylic acid" covers a concept that includes both acrylic acid and methacrylic acid, the term "(meth)acrylate" covers a concept that includes both acrylate and methacrylate, and the term "(meth)acryloyl group" covers a concept that includes both an acryloyl group and a methacryloyl group.

In the present specification, a ratio of constituent units in a resin may be referred to as a "copolymerization ratio".

Hydrocarbon groups such as alkyl groups, aryl groups, alkylene groups, and arylene groups in the present disclosure may be branched or may have a ring structure unless otherwise stated.

In the present disclosure, the term "% by mass" and the term "% by weight" have the same meaning, and the term "part by mass" and the term "part by weight" have the same meaning.

In the present disclosure, combinations of at least two preferred embodiments are more preferred embodiments.

Photo-Curable Ink Composition

A photo-curable ink composition (hereinafter, also simply referred to as an "ink composition") according to the present disclosure contains an amine resin (hereinafter also referred to as a "specific resin") including a constituent unit A represented by a formula (1) or a formula (2) and a constituent unit B represented by any of a formula (3) to a formula (7) and a radical-polymerizable monomer. The radical-polymerizable monomer contains at least one of a monofunctional radical-polymerizable monomer or a bifunctional radical-polymerizable monomer. A total content of the monofunctional radical-polymerizable monomer and the bifunctional radical-polymerizable monomer is 50% by mass or more based on a total mass of the photo-curable ink composition. In the radical-polymerizable monomer, a content of a radical-polymerizable monomer having an acid group is 1.5 mmol or less per 100 g of the photo-curable ink composition.

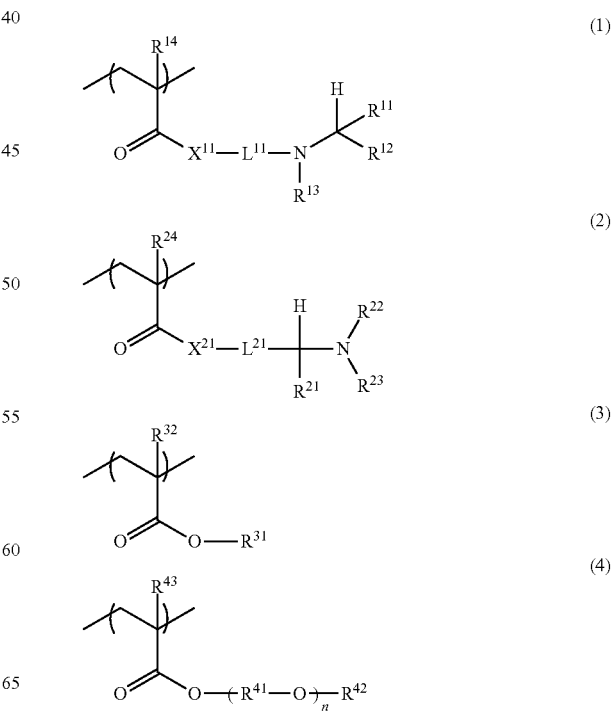

-continued

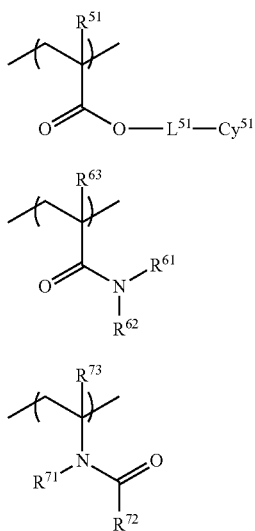

In the formula (1), $X^{11}$ represents O or $NR^{15}$, $R^{11}$ to $R^{13}$ each independently represent a hydrogen atom or a hydrocarbon group having 1 to 11 carbon atoms, $R^{14}$ represents a hydrogen atom or a hydrocarbon group having 1 to 5 carbon atoms, $L^{11}$ represents a hydrocarbon group having 1 to 11 carbon atoms, $R^{15}$ represents a hydrogen atom or a hydrocarbon group having 1 to 11 carbon atoms, $R^{13}$ and $L^{11}$ may be linked to each other to form a ring, $R^{12}$ and $R^{13}$ may be linked to each other to form a ring, and $R^{15}$ and $L^{11}$ may be linked to each other to form a ring.

In the formula (2), $X^{21}$ represents O or $NR^{25}$, $R^{21}$ to $R^{23}$ each independently represent a hydrogen atom or a hydrocarbon group having 1 to 11 carbon atoms, $R^{24}$ represents a hydrogen atom or a hydrocarbon group having 1 to 5 carbon atoms, $L^{21}$ represents a hydrocarbon group having 1 to 11 carbon atoms, $R^{25}$ represents a hydrogen atom or a hydrocarbon group having 1 to 11 carbon atoms, $R^{21}$ and $L^{21}$ may be linked to each other to form a ring, $R^{22}$ and $R^{23}$ may be linked to each other to form a ring, and $R^{25}$ and $L^{21}$ may be linked to each other to form a ring.

In the formula (3), $R^{31}$ represents a branched or unbranched hydrocarbon group having 1 to 11 carbon atoms, and $R^{32}$ represents a hydrogen atom or a hydrocarbon group having 1 to 5 carbon atoms.

In the formula (4), $R^{41}$ at each occurrence independently represents a branched or unbranched hydrocarbon group having 1 to 10 carbon atoms, $R^{42}$ represents a hydrogen atom or a branched or unbranched hydrocarbon group having 1 to 10 carbon atoms, $R^{43}$ represents a hydrogen atom or a hydrocarbon group having 1 to 5 carbon atoms, and n represents an integer of 1 to 50.

In the formula (5), $Cy^{51}$ represents a hydrocarbon group having a ring structure that has 3 to 15 carbon atoms and that may have an oxygen atom, $L^{51}$ represents a single bond or a divalent linking group, and $R^{51}$ represents a hydrogen atom or a hydrocarbon group having 1 to 5 carbon atoms.

In the formula (6), $R^{61}$ and $R^{62}$ each independently represent a hydrogen atom or a hydrocarbon group that has 1 to 11 carbon atoms and that may include an oxygen atom, $R^{61}$ and $R^{62}$ may be linked to each other to have a ring structure, and $R^{63}$ represents a hydrogen atom or a hydrocarbon group having 1 to 5 carbon atoms.

In the formula (7), $R^{71}$ and $R^{72}$ each independently represent a hydrogen atom or a hydrocarbon group having 1 to 11 carbon atoms, $R^{71}$ and $R^{72}$ may be linked to each other to have a ring structure, and $R^{73}$ represents a hydrogen atom or a hydrocarbon group having 1 to 5 carbon atoms.

Hereinafter, the constituent unit represented by the formula (1), the constituent unit represented by the formula (2), the constituent unit represented by the formula (3), the constituent unit represented by the formula (4), the constituent unit represented by the formula (5), the constituent unit represented by the formula (6), and the constituent unit represented by the formula (7) may be referred to as a "unit (1)", a "unit (2)", a "unit (3)", a "unit (4)", a "unit (5)", a "unit (6)", and a "unit (7)", respectively.

Similarly, a constituent unit represented by a formula (X) may be referred to as a "unit (X)".

According to the ink composition according to the present disclosure, an image having good glossiness can be formed.

The reason why an image having good glossiness can be formed by the ink composition according to the present disclosure is considered as follows.

The specific resin which is one component of the ink composition according to the present disclosure includes at least one selected from the group consisting of the unit (1) and the unit (2) as the constituent unit A.

The unit (1) and the unit (2) each include a carbon atom (hereinafter also referred to as "α-carbon") at the α-position with respect to a nitrogen atom and further include at least one hydrogen atom (hereinafter also referred to as "α-hydrogen") bonded to the α-carbon.

In the formulae (1) and (2) below, the hydrogen atoms surrounded by the dashed line circles are each α-hydrogen.

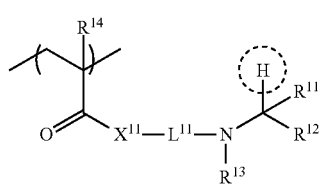

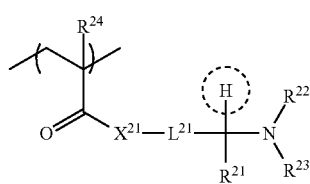

The constituent unit A including α-hydrogen (that is, at least one selected from the group consisting of the unit (1) and the unit (2)) is considered to have a function of suppressing a phenomenon (oxygen inhibition) in which radical polymerization of a radical-polymerizable monomer is inhibited by oxygen. Therefore, it is considered that since the ink composition includes the specific resin including the constituent unit A and a radical-polymerizable monomer, radical polymerization of the radical-polymerizable monomer is efficiently caused during light irradiation, the difference in curing rate between the inside and the surface of an ink film is small, a stress generated by the difference in curing rate and applied to the resulting cured film is small, formation of wrinkles and the like is suppressed, and an image having good glossiness is obtained.

Furthermore, it is considered that the constituent unit B (at least one selected from the group consisting of the unit (3) to the unit (7)) included in the specific resin improves compatibility with the radical-polymerizable monomer, can suppress the oxygen inhibition, and provides an image having good glossiness.

The ink composition according to the present disclosure can be suitably used as an ink composition for ink jet recording.

The ink composition according to the present disclosure may be an ink composition containing a colorant or a transparent ink composition (also referred to as, for example, "clear ink") containing no colorant.

Amine Resin (Specific Resin)

The ink composition according to the present disclosure contains an amine resin (specific resin) including a constituent unit A represented by the formula (1) or the formula (2), and a constituent unit B represented by any of the formula (3) to the formula (7).

The ink composition according to the present disclosure may contain a specific resin alone or contain two or more specific resins.

The specific resin may include another constituent unit besides the constituent unit A and the constituent unit B within a range that does not impair the effects of the present invention.

The specific resin may include only one constituent unit A or include two or more constituent units A.

The specific resin may include only one constituent unit B or include two or more constituent units B.

However, the total content of the constituent unit A and the constituent unit B is preferably 80% by mass or more, more preferably 90% by mass or more, still more preferably 95% by mass or more, and ideally 100% by mass based on the total mass of the specific resin from the viewpoint of more effectively exerting the effects of the present invention.

A ratio of a content of the constituent unit A to a total content of the constituent unit A and the constituent unit B in the specific resin is not particularly limited.

The ratio is preferably 10% by mass to 90% by mass, more preferably 20% by mass to 80% by mass, and particularly preferably 30% by mass to 70% by mass from the viewpoint of glossiness, storage stability, and blocking resistance.

A preferred range of a ratio of a content of the constituent unit A to a total mass of the specific resin is preferably 10% by mass to 90% by mass, more preferably 30% by mass to 80% by mass, and particularly preferably 40% by mass to 70% by mass from the viewpoint of glossiness, storage stability, and blocking resistance.

From the viewpoint of glossiness, the amine resin preferably includes an amine resin including at least one constituent unit represented by a formula (1a) or a formula (2b) as the constituent unit A and at least one constituent unit represented by the formula (3) or the formula (4) as the constituent unit B or an amine resin including a constituent unit represented by a formula (1c) as the constituent unit A and at least one constituent unit represented by any of the formula (5) to the formula (7) as the constituent unit B.

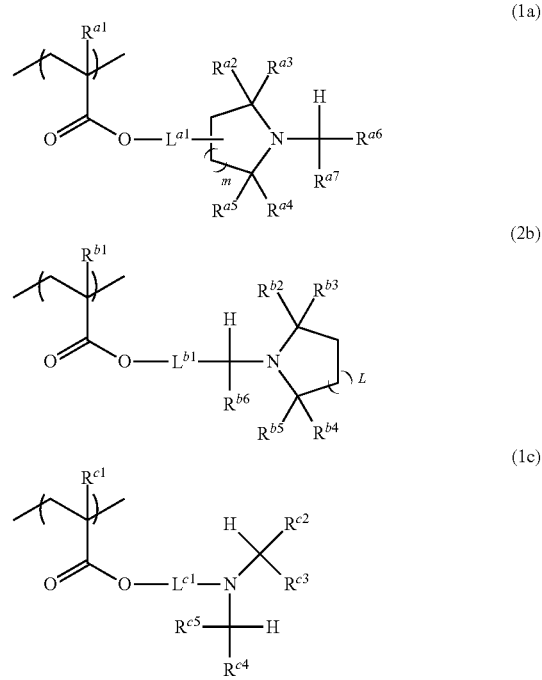

In the formula (1a), $R^{a1}$ represents a hydrogen atom or a methyl group, $L^{a1}$ represents a single bond or a divalent hydrocarbon group having 1 to 11 carbon atoms, $R^{a2}$ to $R^{a5}$ each independently represent a hydrogen atom or a hydrocarbon group having 1 to 3 carbon atoms, $R^{a6}$ and $R^{a7}$ each independently represent a hydrogen atom or a hydrocarbon group having 1 to 10 carbon atoms, and m represents 1 or 2.

In the formula (2b), $R^{b1}$ represents a hydrogen atom or a methyl group, $L^{b1}$ represents a single bond or a divalent hydrocarbon group having 1 to 11 carbon atoms, $R^{b2}$ to $R^{b5}$ each independently represent a hydrogen atom or a hydrocarbon group having 1 to 3 carbon atoms, $R^{b6}$ represents a hydrogen atom or a hydrocarbon group having 1 to 10 carbon atoms, and L represents 1 or 2.

In the formula (1c), $R^{c1}$ represents a hydrogen atom or a methyl group, $L^{c1}$ represents a divalent hydrocarbon group having 1 to 11 carbon atoms, and $R^{c2}$ to $R^{c5}$ each independently represent a hydrogen atom or a hydrocarbon group having 1 to 10 carbon atoms.

From the viewpoint of glossiness, the amine resin more preferably includes an amine resin including a constituent unit represented by a formula (1d) as the constituent unit A and a constituent unit represented by the formula (3) or the formula (4) as the constituent unit B.

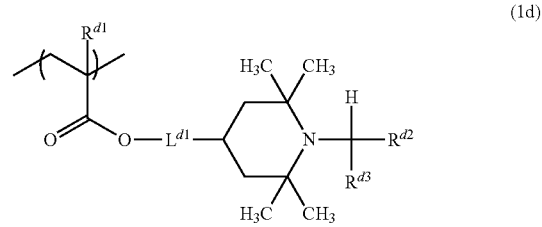

In the formula (1d), $R^{d1}$ represents a hydrogen atom or a methyl group, $L^{d1}$ represents a single bond or a divalent hydrocarbon group having 1 to 11 carbon atoms, and $R^{d2}$ and $R^{d3}$ each independently represent a hydrogen atom or a hydrocarbon group having 1 to 3 carbon atoms.

From the viewpoint of glossiness, the amine resin particularly preferably includes an amine resin including a constituent unit represented by the formula (1c) as the constituent unit A and a constituent unit represented by the formula (5) and a constituent unit represented by the formula (6) or the formula (7) as the constituent unit B.

From the viewpoint of glossiness, the constituent unit A is preferably a constituent unit represented by the formula (1a), the formula (2b), or the formula (1c) and more preferably a constituent unit represented by the formula (1 d).

From the viewpoint of glossiness, $X^{11}$ in the formula (1) is preferably O or NH and more preferably O.

From the viewpoint of glossiness, $R^{11}$ to $R^{13}$ in the formula (1) are each independently preferably a hydrocarbon group having 1 to 11 carbon atoms. $R^{13}$ and $L^{11}$ may be linked to each other to form a ring, and $R^{12}$ and $R^{13}$ may be linked to each other to form a ring.

From the viewpoint of curability, $R^{14}$ in the formula (1) is preferably a hydrogen atom or a methyl group.

From the viewpoint of glossiness, $L^{11}$ in the formula (1) is preferably a hydrocarbon group having 2 to 11 carbon atoms, more preferably a hydrocarbon group having 2 to 6 carbon atoms, still more preferably a hydrocarbon group having 2 or 3 carbon atoms, and particularly preferably an ethylene group or a propylene group.

From the viewpoint of glossiness, $X^{21}$ in the formula (2) is preferably O or NH and more preferably O.

From the viewpoint of glossiness, $R^{21}$ to $R^{23}$ in the formula (2) are each independently preferably a hydrocarbon group having 1 to 11 carbon atoms. $R^{21}$ and $L^{21}$ may be linked to each other to form a ring, and $R^{22}$ and $R^{23}$ may be linked to each other to form a ring.

From the viewpoint of curability, $R^{24}$ in the formula (2) is preferably a hydrogen atom or a methyl group.

From the viewpoint of glossiness, $L^{21}$ in the formula (2) is preferably a hydrocarbon group having 2 to 11 carbon atoms, more preferably a hydrocarbon group having 2 to 6 carbon atoms, still more preferably a hydrocarbon group having 2 or 3 carbon atoms, and particularly preferably an ethylene group or a propylene group.

From the viewpoint of glossiness, examples of the constituent unit A preferably include constituent units (1-1) to (1-15) below.

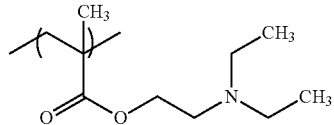

(1-1)

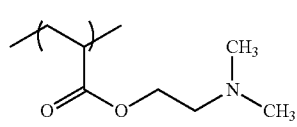

(1-2)

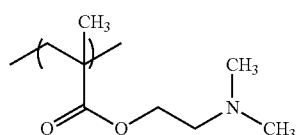

(1-3)

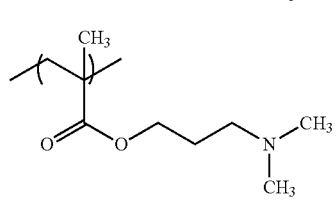

(1-4)

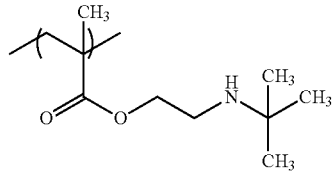

(1-5)

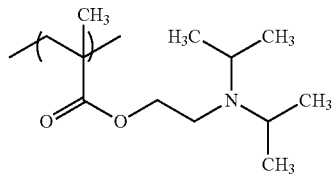

(1-6)

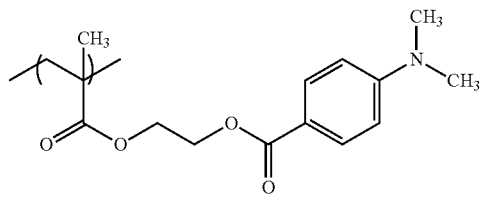

(1-7)

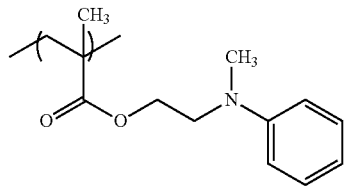

(1-8)

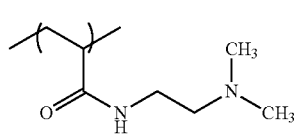

(1-9)

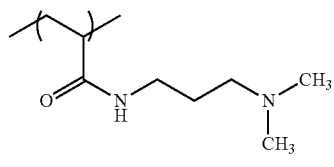

(1-10)

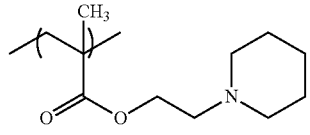

(1-11)

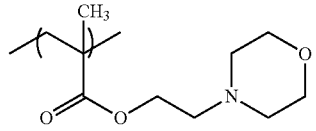

(1-12)

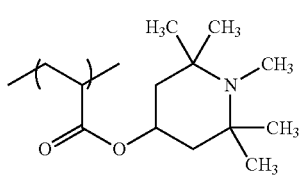
(1-13)

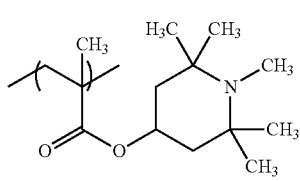
(1-14)

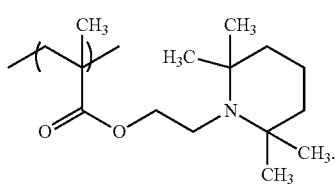
(1-15)

Of these, from the viewpoint of glossiness, at least one constituent unit selected from the group consisting of the constituent units (1-1) to (1-6) and the constituent units (1-10) to (1-14) are preferred, at least one constituent unit selected from the group consisting of the constituent units (1-1) to (1-4) and the constituent units (1-11) to (1-14) are more preferred, and at least one constituent unit selected from the group consisting of the constituent units (1-13) and (1-14) are particularly preferred as the constituent unit A.

In the formula (3), from the viewpoint of glossiness and curability, $R^{31}$ is preferably a branched or unbranched hydrocarbon group having 1 to 8 carbon atoms, and $R^{32}$ is preferably a hydrogen atom or a methyl group.

In the formula (4), from the viewpoint of glossiness and curability, $R^{41}$ is independently at each occurrence preferably a branched or unbranched hydrocarbon group having 2 to 4 carbon atoms, $R^{42}$ is preferably a hydrogen atom or a branched or unbranched hydrocarbon group having 1 to 4 carbon atoms, $R^{43}$ is preferably a hydrogen atom or a methyl group, and n is preferably an integer of 1 to 30.

In the formula (5), from the viewpoint of glossiness and curability, $Cy^{51}$ is preferably a hydrocarbon group having a polycyclic structure having 3 to 15 carbon atoms.

In the formula (6), from the viewpoint of glossiness and curability, $R^{61}$ and $R^{62}$ are each independently preferably a hydrocarbon group that has 1 to 4 carbon atoms and that may include an oxygen atom, $R^{61}$ and $R^{62}$ may be linked to each other to have a ring structure, and $R^{63}$ is preferably a hydrogen atom or a methyl group.

From the viewpoint of glossiness and curability, the constituent unit represented by the formula (7) is preferably a constituent unit represented by a formula (7a) below.

In the formula (7a) below, $R^{73}$ represents a hydrogen atom or a methyl group, and k represents an integer of 1 to 3.

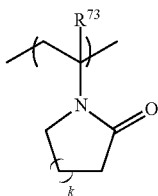
(7a)

$R^{31}$ in the formula (3) is preferably a branched or unbranched hydrocarbon group having 1 to 8 carbon atoms, more preferably a branched or unbranched hydrocarbon group having 1 to 4 carbon atoms, and still more preferably a branched or unbranched hydrocarbon group having 2 to 4 carbon atoms.

$R^{32}$ in the formula (3) is preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

From the viewpoint of glossiness, examples of the constituent unit represented by the formula (3) preferably include constituent units (3-1) to (3-13) below.

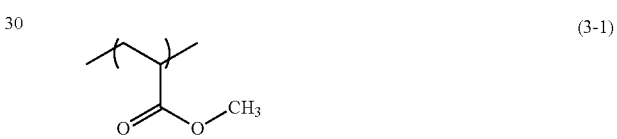
(3-1)

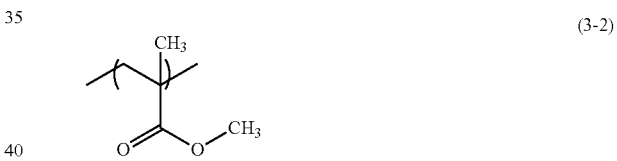
(3-2)

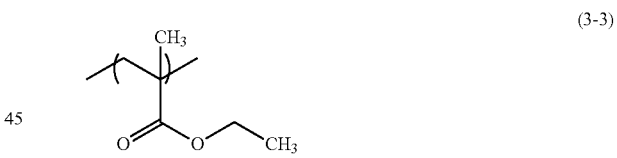
(3-3)

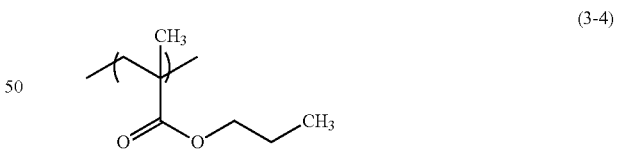
(3-4)

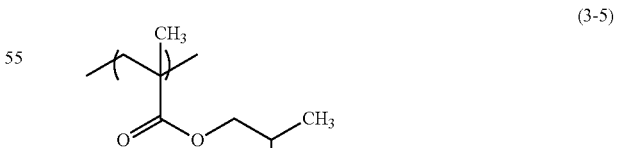
(3-5)

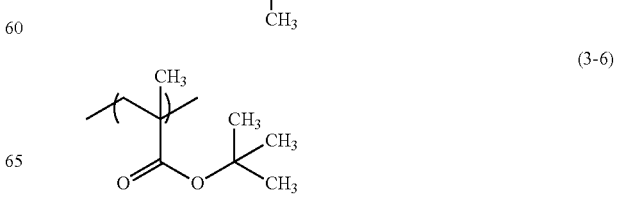
(3-6)

(3-7)
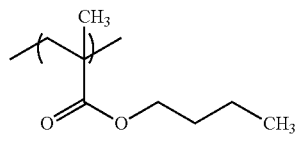

(3-8)
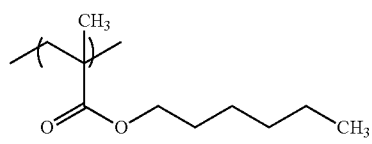

(3-9)
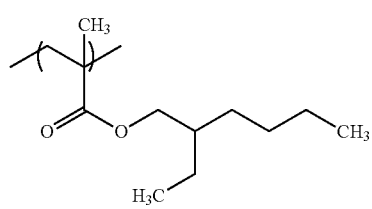

(3-10)
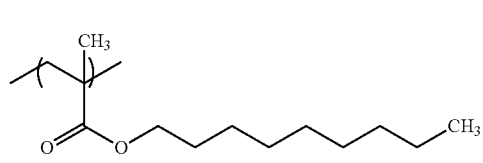

(3-11)
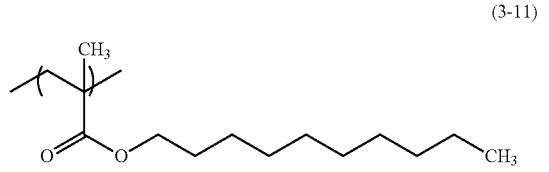

(3-12)
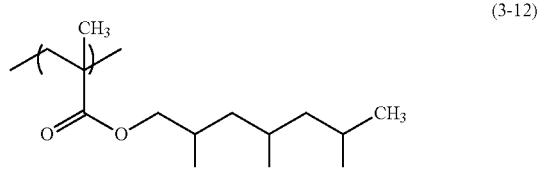

(3-13)
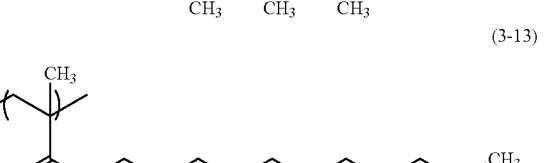

$R^{41}$ in the formula (4) is independently at each occurrence preferably a branched or unbranched hydrocarbon group having 2 to 10 carbon atoms, more preferably a branched or unbranched hydrocarbon group having 2 to 6 carbon atoms, and still more preferably an ethylene group or a propylene group.

$R^{42}$ in the formula (4) is preferably a branched or unbranched hydrocarbon group having 1 to 10 carbon atoms, more preferably a branched or unbranched hydrocarbon group having 1 to 4 carbon atoms, and still more preferably a methyl group.

$R^{43}$ in the formula (4) is preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

In the formula (4), n is preferably an integer of 1 to 30, and more preferably an integer of 1 to 10.

From the viewpoint of glossiness, examples of the constituent unit represented by the formula (4) preferably include constituent units (4-1) to (4-12) below.

(4-1)
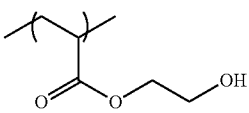

(4-2)
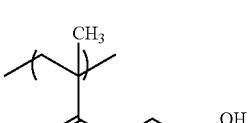

(4-3)
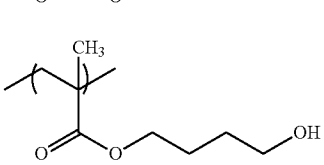

(4-4)
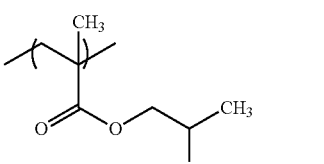

(4-5)
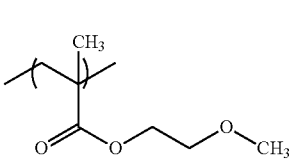

(4-6)
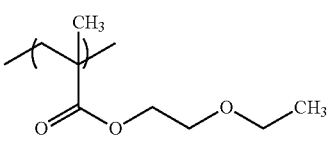

(4-7)
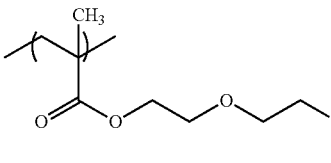

(4-8)
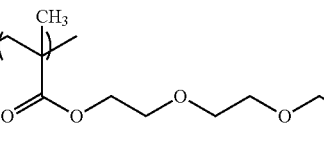

(4-9)
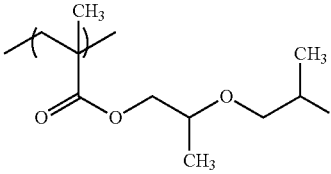

-continued (4-10)

[chemical structure: methacrylate with -O-(CH2)4-O-(CH2)4-O-CH3]

(4-11)

[chemical structure: methacrylate with -O-(CH2CH2-O)j-CH3]

(4-12)

[chemical structure: methacrylate with -O-(CH(CH3)CH2-O)j-H]

The number of repetitions of the ethyleneoxy unit in the constituent unit (4-11) and the number of repetitions of the propyleneoxy unit in the constituent unit (4-12) are each independently 1 to 30.

In $L^{51}$ of the formula (5), the divalent linking group is preferably an alkylene group having 1 to 3 carbon atoms or a group represented by any one of a formula (L31) to a formula (L34) below.

*1—(L—O)$_n$—*2 (L31)

*1—L—O—C(=O)—*2 (L32)

*1—L$^1$—O—C(=O)—L$^2$—C(=O)—O—*2 (L33)

*1—CH2—CH(OH)—CH2—O—*2 (L34)

In the formula (L31), L represents an alkylene group having 1 to 3 carbon atoms, n represents an integer of 1 to 4, *1 represents a position linked to an oxygen atom, and *2 represents a position linked to $Cy^{51}$.

In the formula (L32), L represents an alkylene group having 1 to 3 carbon atoms, *1 represents a position linked to an oxygen atom, and *2 represents a position linked to $Cy^{51}$.

In the formula (L33), $L^1$ and $L^2$ each independently represent an alkylene group having 1 to 3 carbon atoms, *1 represents a position linked to an oxygen atom, and *2 represents a position linked to $Cy^{51}$.

In the formula (L34), *1 represents a position linked to an oxygen atom, and *2 represents a position linked to $Cy^{51}$.

In the formula (L31), n is preferably an integer of 1 to 3, more preferably 1 or 2, and particularly preferably 1.

In $Cy^{51}$, the number of carbon atoms of the hydrocarbon group including a ring structure that may include an oxygen atom is preferably 3 to 20, more preferably 6 to 20, still more preferably 6 to 12, and particularly preferably 6 to 10.

Examples of the hydrocarbon group including a ring structure that may include an oxygen atom include substituted or unsubstituted aryl groups, substituted or unsubstituted alicyclic groups, substituted or unsubstituted cyclic acetal groups, substituted or unsubstituted cyclic ether groups, substituted or unsubstituted lactone groups, and substituted or unsubstituted heteroaryl groups including an oxygen atom as a heteroatom. Examples of the substituents in the substituted aryl groups, the substituted alicyclic groups, the substituted cyclic acetal groups, the substituted cyclic ether groups, the substituted lactone groups, and the substituted heteroaryl groups include alkoxy groups, acyl groups, acyloxy groups, alkoxy carbonyl groups, a hydroxy group, and a carboxy group.

Examples of the hydrocarbon group including a ring structure that may include an oxygen atom include a phenyl group, a naphthyl group, a biphenyl group, a cyclohexyl group, alkylcyclohexyl groups, a norbornyl group, a dicyclopentanyl group, a dicyclopentenyl group, an adamantyl group, a furfuryl group, a hydrofurfuryl group, cyclic acetal groups, cyclic ether groups, and lactone groups.

$R^{51}$ in the formula (5) is preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

Particularly preferred embodiments of the formula (5) are embodiments in which $R^{51}$ represents a hydrogen atom or an alkyl group having 1 to 3 carbon atoms, $L^{51}$ represents a single bond, an alkylene group having 1 to 3 carbon atoms, or a group represented by any one of the formula (L31) to the formula (L34), and $Cy^{51}$ represents a hydrocarbon group having 3 to 20 carbon atoms and including a ring structure that may include an oxygen atom.

From the viewpoint of blocking resistance and adhesion of a film to a substrate, $Cy^{51}$ preferably includes, as a ring structure, a polycyclic structure and more preferably includes a polycyclic alicyclic structure.

From the viewpoint of glossiness, examples of the constituent unit represented by the formula (5) preferably include constituent units (5-1) to (5-13) below, more preferably include the constituent units (5-4), (5-7), (5-8), (5-9), (5-10), (5-11), and (5-12) below, and particularly preferably include the constituent units (5-9), (5-10), (5-11), and (5-12).

(5-1)

[chemical structure: acrylate with cyclohexyl group]

(5-2)

[chemical structure: methacrylate with cyclohexyl group]

(5-3)

[chemical structure: methacrylate with phenyl group]

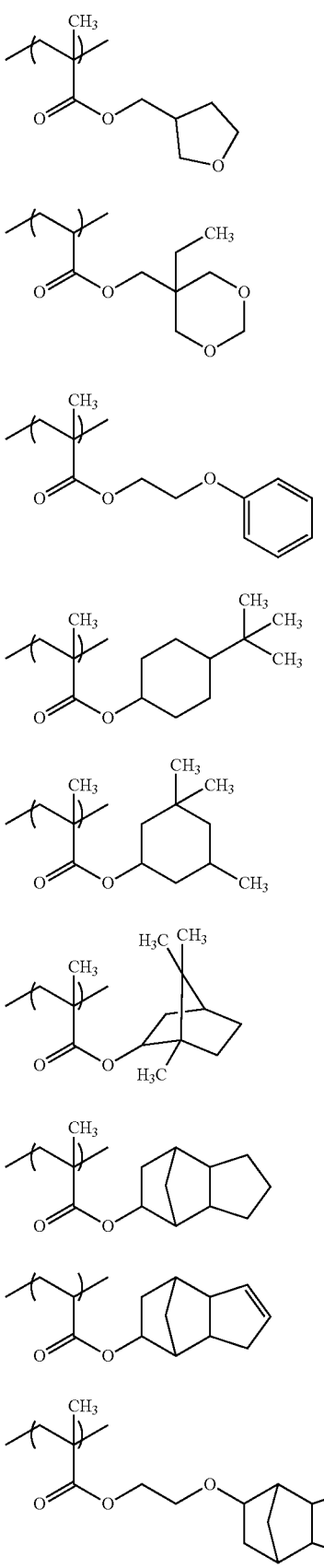

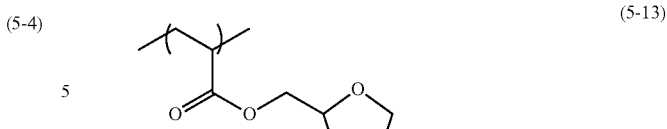

In $R^{61}$ and $R^{62}$ in the formula (6), the number of carbon atoms of the hydrocarbon group that may include an oxygen atom is preferably 1 to 6 and more preferably 1 to 3.

With regard to the "hydrocarbon group that may include an oxygen atom" in $R^{61}$ and $R^{62}$ in the formula (6), examples of the hydrocarbon group that includes an oxygen atom include hydrocarbon groups substituted with an alkoxy group, hydrocarbon groups substituted with an acyl group, hydrocarbon groups substituted with an acyloxy group, hydrocarbon groups substituted with an alkoxycarbonyl group, hydrocarbon groups substituted with a hydroxy group, and hydrocarbon groups substituted with a carboxyl group.

$R^{61}$ or $R^{62}$ is preferably a hydrocarbon group that has 1 to 12 carbon atoms, that may be substituted with a halogen atom, and that may include an oxygen atom, a hydrogen atom, or a hydroxy group; preferably a hydrogen atom, a hydroxy group, an alkyl group having 1 to 12 carbon atoms, a halogenated alkyl group having 1 to 12 carbon atoms (preferably a chlorinated alkyl group having 1 to 12 carbon atoms), an alkenyl group having 2 to 12 carbon atoms, an acyloxyalkyl group having 3 to 12 carbon atoms, an aryl group having 6 to 12 carbon atoms (such as a phenyl group, a naphthyl group, or a biphenyl group), an aralkyl group having 7 to 12 carbon atoms (such as a benzyl group), or an aryloxyalkyl group having 7 to 12 carbon atoms (such as a phenoxyethyl group); more preferably a hydrogen atom, an alkyl group having 1 to 12 carbon atoms, or an aryl group having 6 to 12 carbon atoms; still more preferably a hydrogen atom or an alkyl group having 1 to 3 carbon atoms; still more preferably a hydrogen atom, a methyl group, or an ethyl group; and particularly preferably a hydrogen atom or a methyl group.

$R^{63}$ in the formula (6) is preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

From the viewpoint of hardness of the resulting cured film (image), in the formula (6), $R^{61}$ and $R^{62}$ preferably each independently represent a hydrocarbon group that may include an oxygen atom, or $R^{61}$ and $R^{62}$ are preferably bonded to each other to form (that is, $R^{61}$ and $R^{62}$ preferably together form) a ring.

When $R^{61}$ and $R^{62}$ are bonded to each other to form a ring, $R^{61}$ and $R^{62}$ are preferably a group represented by any one of a formula (N41) to a formula (N44) below.

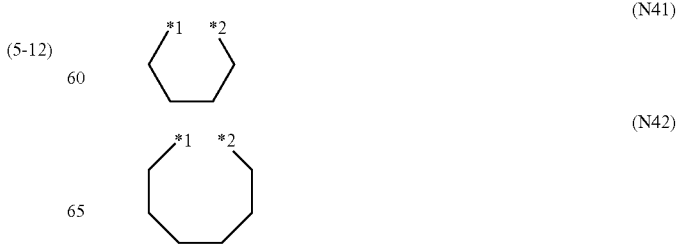

(N43)

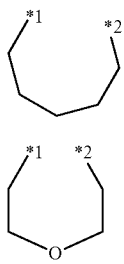

(N44)

In the formula (N41) to the formula (N44), *1 and *2 each represent a position linked to a nitrogen atom.

Particularly preferred embodiments of the formula (6) are embodiments in which $R^{61}$ and $R^{62}$ each independently represent a hydrogen atom or an alkyl group having 1 to 3 carbon atoms or $R^{61}$ and $R^{62}$ are bonded to each other to represent a group represented by any one of the formula (N41) to the formula (N44), and $R^{63}$ represents a hydrogen atom or an alkyl group having 1 to 3 carbon atoms.

From the viewpoint of hardness of the resulting cured film, among these embodiments, more preferred embodiments are embodiments in which $R^{61}$ and $R^{62}$ each independently represent an alkyl group having 1 to 3 carbon atoms or $R^{61}$ and $R^{62}$ are bonded to each other to represent (that is, $R^{61}$ and $R^{62}$ together represent) a group represented by any one of the formula (N41) to the formula (N44).

From the viewpoint of glossiness, examples of the constituent unit represented by the formula (6) preferably include constituent units (6-1) to (6-12) below, more preferably include constituent units (6-3), (6-4), (6-7), (6-8), (6-10), (6-11), and (6-12), and particularly preferably include constituent units (6-10), (6-11), and (6-12).

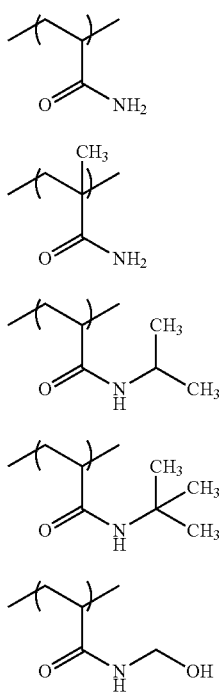

(6-1)

(6-2)

(6-3)

(6-4)

(6-5)

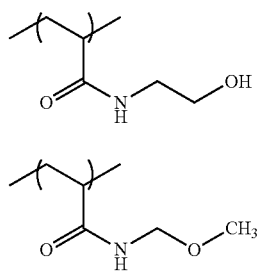

(6-6)

(6-7)

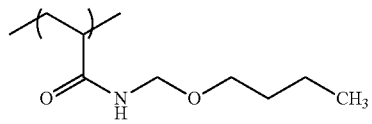

(6-8)

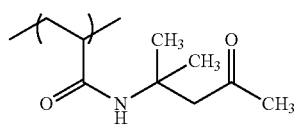

(6-9)

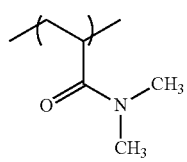

(6-10)

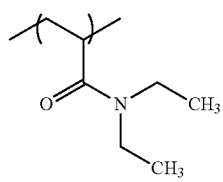

(6-11)

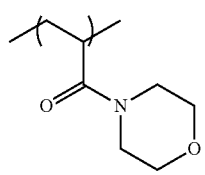

(6-12)

In $R^{71}$ and $R^{72}$ in the formula (7), the number of carbon atoms of the hydrocarbon group is preferably 1 to 6 and more preferably 1 to 3.

From the viewpoint of hardness of the resulting cured film, in the formula (7), $R^{71}$ and $R^{72}$ are preferably each independently a hydrocarbon group, or $R^{71}$ and $R^{72}$ are preferably bonded to each other to form (that is, $R^{71}$ and $R^{72}$ preferably together form) a ring.

When $R^{71}$ and $R^{72}$ are bonded to each other to form a ring, the group formed by $R^{71}$ and $R^{72}$ together is particular preferably a group represented by a formula (N51) or a formula (N52).

(N51)

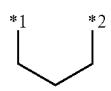

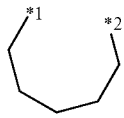 (N52)

In the formula (N51) or the formula (N52), *1 represents a position linked to a nitrogen atom, and *2 represents a position linked to a carbon atom.

$R^{73}$ in the formula (7) is preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

Preferred embodiments of the formula (7) are embodiments in which $R^{71}$ and $R^{72}$ each independently represent a hydrogen atom or an alkyl group having 1 to 6 carbon atoms or $R^{71}$ and $R^{72}$ are bonded to each other to represent (that is, $R^{71}$ and $R^{72}$ together represent) a group represented by the formula (N51) or the formula (N52), and $R^{73}$ represents a hydrogen atom or an alkyl group having 1 to 3 carbon atoms (preferably a hydrogen atom).

From the viewpoint of hardness of the resulting cured film, among these embodiments, more preferred embodiments are embodiments in which $R^{71}$ and $R^{72}$ each independently represent an alkyl group having 1 to 6 carbon atoms or $R^{71}$ and $R^{72}$ are bonded to each other to represent a group represented by the formula (N51) or the formula (N52).

From the viewpoint of glossiness, examples of the constituent unit represented by the formula (7) preferably include constituent units (7-1) to (7-5) below.

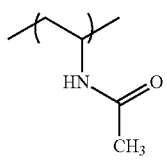 (7-1)

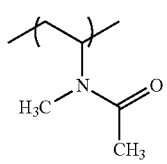 (7-2)

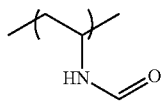 (7-3)

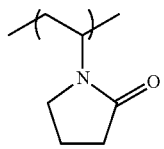 (7-4)

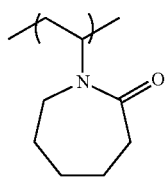 (7-5)

From the viewpoint of glossiness, examples of the constituent unit represented by the formula (7) preferably include the constituent unit (7a) and particularly preferably include at least one constituent unit selected from the group consisting of the constituent units (7-4) and (7-5).

From the viewpoint of glossiness, at least one terminal structure of the amine resin is preferably a structure represented by a formula (8). For example, when the amine resin is a linear resin, the amine resin may have the structure on one terminal or both terminals thereof.

$$R^{81}-S-* \tag{8}$$

In the formula (8), $R^{81}$ represents a branched or unbranched hydrocarbon group having 8 to 20 carbon atoms, and * represents a site linked to the resin.

From the viewpoint of glossiness, $R^{81}$ in the formula (8) is preferably a branched or unbranched hydrocarbon group having 8 to 16 carbon atoms, and more preferably a linear alkyl group having 8 to 16 carbon atoms.

In addition, from the viewpoint of glossiness, the amine resin preferably has, as at least one terminal structure, at least one structure selected from the group consisting of constituent units (8-1) to (8-19) below, more preferably has at least one structure selected from the group consisting of the constituent units (8-3) to (8-11) below, still more preferably has at least one structure selected from the group consisting of the constituent units (8-3) to (8-6) below, and particularly preferably has at least one structure selected from the group consisting of the constituent units (8-3) to (8-5) below.

From the viewpoint of glossiness, as the structure represented by the formula (8), the amine resin preferably has at least one structure selected from the group consisting of the constituent units (8-3) to (8-11) below, more preferably has at least one structure selected from the group consisting of the constituent units (8-3) to (8-6) below, and particularly preferably has at least one structure selected from the group consisting of the constituent units (8-3) to (8-5) below.

In the constituent units (8-1) to (8-19) below, * represents a site linked to the resin.

(8-1) 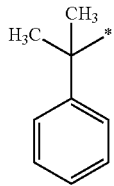
(8-2) 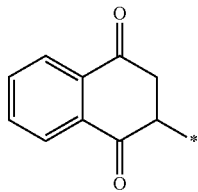
(8-3) 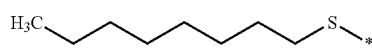
(8-4) 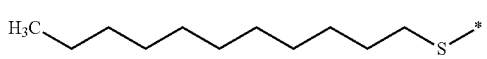
(8-5) 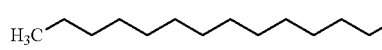
(8-6) 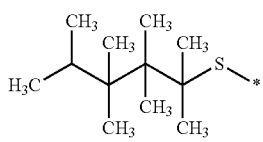
(8-7) 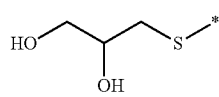
(8-8) 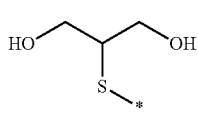
(8-9) 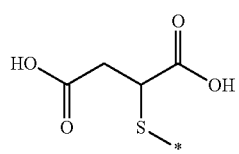
(8-10) 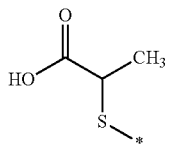
(8-11) 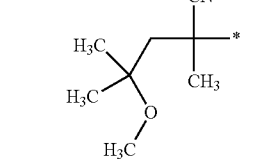
(8-12) 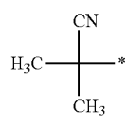
(8-13) 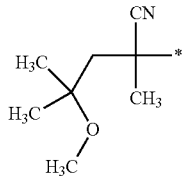
(8-14) 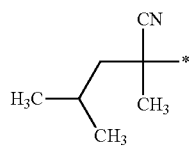
(8-15) 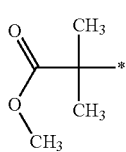
(8-16) 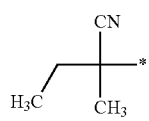
(8-17) 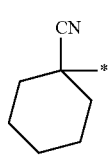
(8-18) 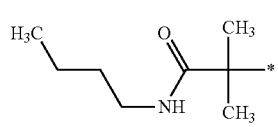
(8-19) 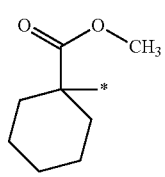

The method for introducing any of the constituent units (8-1) to (8-19) into a terminal of the amine resin is not particularly limited. The constituent units (8-1) to (8-19) can be introduced by using compounds shown below as a polymerization initiator or a chain transfer agent during polymerization.

Of the compounds, at least one compound selected from the group consisting of a compound (8-3s) to a compound (8-6s) below, which are chain transfer agents, is also preferably used in the synthesis of the amine resin to introduce at least one structure selected from the group consisting of the constituent units (8-3) to (8-6) as at least one terminal structure of the amine resin.

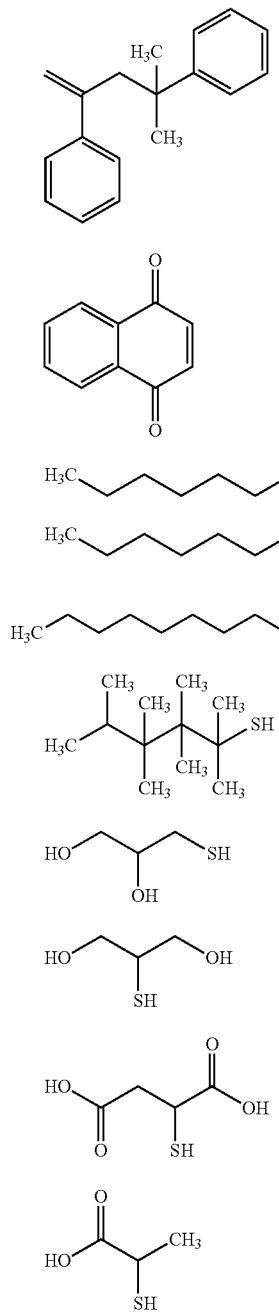
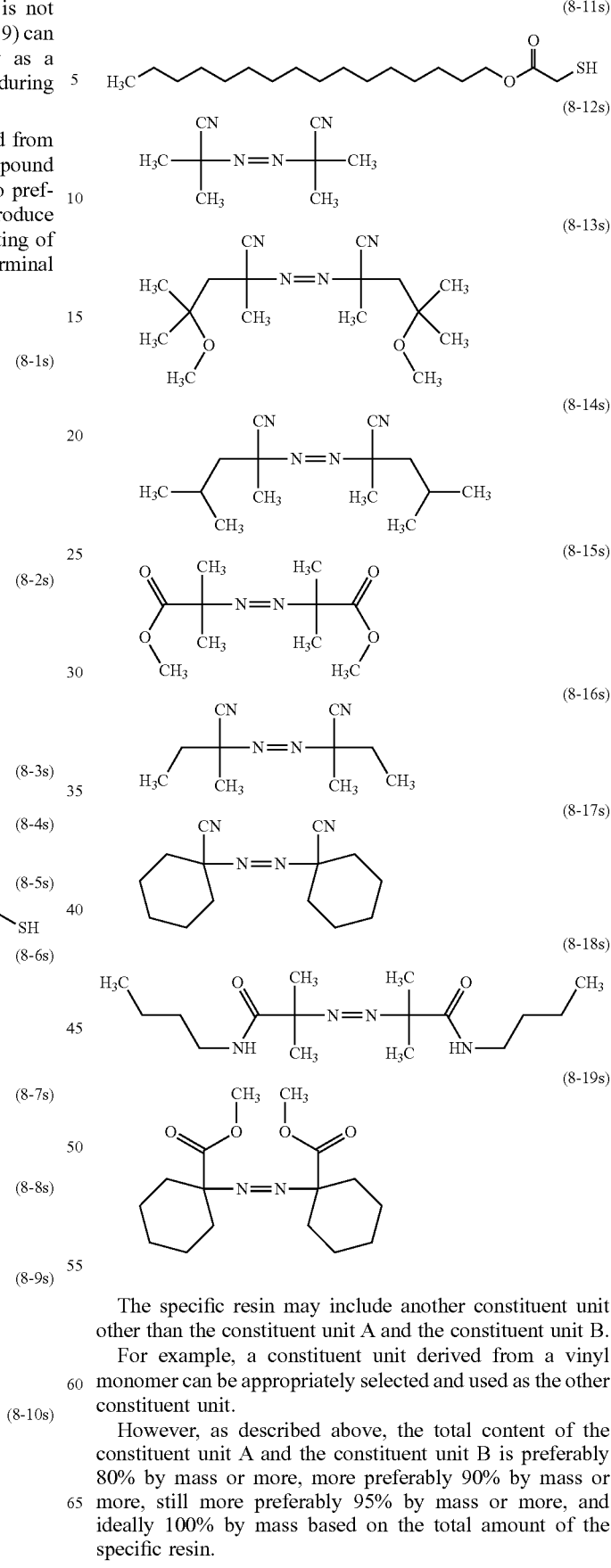

The specific resin may include another constituent unit other than the constituent unit A and the constituent unit B.

For example, a constituent unit derived from a vinyl monomer can be appropriately selected and used as the other constituent unit.

However, as described above, the total content of the constituent unit A and the constituent unit B is preferably 80% by mass or more, more preferably 90% by mass or more, still more preferably 95% by mass or more, and ideally 100% by mass based on the total amount of the specific resin.

The weight-average molecular weight (Mw) of the specific resin is not particularly limited but is preferably 1,000 to 100,000 and more preferably 5,000 to 30,000 from the viewpoint of glossiness.

The weight-average molecular weight (Mw) of the specific resin is preferably 1,000 or more, more preferably 2,000 or more, still more preferably 3,000 or more, and particularly preferably 5,000 or more from the viewpoint of hardness of the resulting film.

Furthermore, the weight-average molecular weight (Mw) of the specific resin is preferably 50,000 or less, more preferably 40,000 or less, and particularly preferably 30,000 or less from the viewpoint of storage stability and ejection stability.

In the present specification, the "weight-average molecular weight (Mw)" is a value measured by gel permeation chromatography (GPC).

In the measurement by gel permeation chromatography (GPC), HLC (registered trademark)-8020GPC (Tosoh Corporation) is used as a measurement apparatus, three TSKgel (registered trademark) Super Multipore HZ-H columns (4.6 mm ID×15 cm, Tosoh Corporation) are used as columns, and THF (tetrahydrofuran) is used as an eluant. Regarding measurement conditions, the measurement is conducted at a sample concentration of 0.45% by mass, at a flow rate of 0.35 mL/min, with an amount of sample injected of 10 μL, and at a measurement temperature of 40° C. by using a refractive index (RI) detector.

A calibration curve is prepared from eight samples of "Standard sample TSK standard, polystyrene" manufactured by Tosoh Corporation: "F-40", "F-20", "F-4", "F-1", "A-5000", "A-2500", and "A-1000" and "n-propylbenzene".

From the viewpoint of glossiness, the amine value of the specific resin is more preferably 0.1 mmol/g to 6.0 mmol/g, more preferably 0.5 mmol/g to 3.5 mmol/g, and still more preferably 1.5 mmol/g to 3.5 mmol/g.

The amine value in the present disclosure is measured by the following method.

About 0.5 g of a polymer to be measured is weighed in a 100-mL beaker, and the weighed value W1 (g) is recorded. Subsequently, a mixed liquid of 54 mL of tetrahydrofuran (THF) and 6 mL of distilled water is added to dilute the weighed polymer. Thus, a sample 1 for measuring an amine value is prepared.

The resulting sample 1 for measuring an amine value is titrated by using a 0.1 N (=0.1 mol/L) aqueous hydrochloric acid solution as a titrant. The amount of titrant necessary to reach the equivalence point is recorded as F1 (mL). In the case where a plurality of equivalence points are obtained in the titration, the value of an equivalence point at the maximum amount of titration is used. Herein, the "maximum amount of titration F1 (mL)" corresponds to the amount of amino groups included in the polymer.

Amine value (mmol/g)=0.1 (mol/L)×$F1$ (mL)/$W1$

From the viewpoint of glossiness, the content of the specific resin is preferably 0.5% by mass to 10% by mass, and more preferably 1% by mass to 8% by mass based on the total mass of the ink composition.

From the viewpoint of hardness of the resulting cured film, the content of the specific resin is preferably 0.5% by mass or more, more preferably 1.0% by mass or more, still more preferably 1.5% by mass or more, and particularly preferably 2.0% by mass or more based on the total amount of the ink composition.

Furthermore, from the viewpoint of storage stability and ejection stability, the content of the specific resin is preferably 10.0% by mass or less, more preferably 9.0% by mass or less, still more preferably 8.0% by mass or less, and particularly preferably 7.0% by mass or less based on the total amount of the ink composition.

Radical-Polymerizable Monomer

The ink composition according to the present disclosure contains a radical-polymerizable monomer (hereinafter, also simply referred to as a "polymerizable monomer"). The polymerizable monomer contained in the ink composition may be one monomer or two or more monomers.

The preferred range of the content of the polymerizable monomer based on the total amount of the ink composition is as described above.

A compound having at least one ethylenically unsaturated bond in one molecule is preferably used as the polymerizable monomer.

Known polymerizable monomers described in, for example, paragraphs 0108 to 0137 of JP2011-225848A, in paragraphs 0150 to 0188 of JP2009-139852A, and in paragraphs 0122 to 0127 of JP2009-209352A can be used as the polymerizable monomer.

As the polymerizable monomer, a monofunctional polymerizable monomer may be used, a polyfunctional polymerizable monomer may be used, or a monofunctional polymerizable monomer and a polyfunctional polymerizable monomer may be used in combination.

Monofunctional polymerizable monomers are advantageous in terms of, for example, decrease in the viscosity of the ink composition and improvement in ejection stability.

Polyfunctional polymerizable monomers are advantageous in terms of, for example, hardness of the resulting film.

Examples of the monofunctional polymerizable monomers include N-vinyl compounds such as N-vinylcaprolactam and N-vinylpyrrolidone; monofunctional acrylate compounds such as 2-phenoxyethyl acrylate (PEA), benzyl acrylate, cyclic trimethylolpropane formal acrylate (CTFA), isobornyl acrylate (IBOA), tetrahydrofurfuryl acrylate, 2-(2-ethoxyethoxy)ethyl acrylate, octyl acrylate, decyl acrylate, tridecyl acrylate, isodecyl acrylate, lauryl acrylate, 3,3,5-trimethylcyclohexyl acrylate (TMCHA), dicyclopentenyl acrylate (DCPA), 4-tert-butylcyclohexyl acrylate, cyclohexyl acrylate, caprolactone-modified acrylate, hydroxyethyl acrylate, hydroxybutyl acrylate, polyethylene glycol acrylate, polypropylene glycol acrylate, nonylphenoxypolyethylene glycol acrylate, and nonylphenoxypolypropylene glycol acrylate; monofunctional methacrylate compounds such as 2-phenoxyethyl methacrylate, benzyl methacrylate, isobornyl methacrylate (IBOMA), tetrahydrofurfuryl methacrylate, 2-(2-ethoxyethoxy)ethyl methacrylate, octyl methacrylate, decyl methacrylate, tridecyl methacrylate, isodecyl methacrylate, lauryl methacrylate, 3,3,5-trimethylcyclohexyl methacrylate (TMCHMA), dicyclopentenyl methacrylate (DCPMA), 4-tert-butylcyclohexyl methacrylate, cyclohexyl methacrylate, caprolactone-modified methacrylate, hydroxyethyl methacrylate, hydroxybutyl methacrylate, polyethylene glycol methacrylate, polypropylene glycol methacrylate, nonylphenoxypolyethylene glycol methacrylate, and nonylphenoxypolypropylene glycol methacrylate; monofunctional vinyl ether compounds such as n-propyl vinyl ether, isopropyl vinyl ether, n-butyl vinyl ether, isobutyl vinyl ether, 2-ethylhexyl vinyl ether, cyclohexyl vinyl ether, 2-hydroxyethyl vinyl ether, 4-hydroxybutyl vinyl ether, and cyclohexane dimethanol monovinyl ether; monofunctional acrylamide compounds such as acrylamide, N,N-dimethylacrylamide, N,N-diethylacrylamide, acryloylmorpholine, N-isopropylacrylamide, N-hydroxyethylacrylamide, N-butylacrylamide, N-tert-butylacrylamide, N-(1,1-dimethyl-3-oxobutyl)acrylamide, N-dodecylacrylamide, and N-(butoxymethyl)acrylamide; and monofunctional methacrylamide compounds such as methacrylamide, N-phenylmethacrylamide, N-(methoxymethyl)methacrylamide, N,N-dimethylmethacrylamide, and N-tert-butylmethacrylamide.

Examples of the polyfunctional polymerizable monomers include polyfunctional acrylate compounds such as hexanediol diacrylate (HDDA), dipropylene glycol diacrylate (DPGDA), polyethylene glycol diacrylate, polypropylene glycol diacrylate, pentaerythritol triacrylate, pentaerythritol tetraacrylate, dipentaerythritol pentaacrylate, dipentaerythritol hexaacrylate (DPHA), trimethylolpropane triacrylate, ditrimethylolpropane tetraacrylate, nonanediol diacrylate, decanediol diacrylate, neopentyl glycol diacrylate, polyethylene glycol-modified bisphenol A diacrylate, dioxane glycol diacrylate, cyclohexane dimethanol diacrylate, and tricyclodecane dimethanol diacrylate; 2-(2-vinyloxyethoxy) ethyl acrylate (VEEA); polyfunctional vinyl compounds such as 1,4-butanediol divinyl ether, cyclohexanedimethanol divinyl ether, diethylene glycol divinyl ether, and triethylene glycol divinyl ether (DVE3); and polyfunctional methacrylate compounds such as hexanediol dimethacrylate, dipropylene glycol dimethacrylate (DPGDMA), polyethylene glycol dimethacrylate, polypropylene glycol dimethacrylate, pentaerythritol trimethacrylate, pentaerythritol tetramethacrylate, neopentyl glycol dimethacrylate, and polyethylene glycol-modified bisphenol A dimethacrylate.

Besides the polymerizable monomers mentioned above, it is also possible to use radical-polymerizable monomers that are commercially available or known in the art and that are described in, for example, "Crosslinking Agent Handbook", (1981, Taiseisha Ltd.) edited by Shinzo Yamashita; "UV/EB Curing Handbook (Raw Material Edition)" (1985, Kobunshi Kankokai) edited by Kiyoshi Kato; "Application and Market of UV/EB Curing Technology", p. 79, (1989, CMC Publishing Co., Ltd.) edited by RadTech Japan; and "Polyester Resin Handbook", (1988, Nikkan Kogyo Shimbun, Ltd.) written by Eiichiro Takiyama.

The polymerizable monomers may be commercially available products on the market. Examples of commercially available products of the polymerizable monomers include AH-600, AT-600, UA-306H, UA-306T, UA-306I, UA-510H, UF-8001G, and DAUA-167 (all of which are available from Kyoeisha Chemical Co., Ltd.); ethoxylated or propoxylated acrylates such as SR444, SR454, SR492, SR499, CD501, SR502, SR9020, CD9021, SR9035, and SR494 (SARTOMER); and isocyanurate monomers such as A-9300 and A-9300-1CL (all of which are available from Shin Nakamura Chemical Co., Ltd.).

Examples of other commercially available products of the polymerizable monomers that can be suitably used include NPGPODA (neopentyl glycol propylene oxide adduct diacrylate, SARTOMER), SR399E (dipentaerythritol pentaacrylate, SARTOMER), ATMM-3L (pentaerythritol triacrylate, Shin Nakamura Chemical Co., Ltd.), and A-DPH (dipentaerythritol hexaacrylate, Shin Nakamura Chemical Co., Ltd.).

The weight-average molecular weight of the polymerizable monomer is preferably 100 or more and less than 1,000, more preferably 100 or more and 800 or less, and still more preferably 150 or more and 700 or less.

The weight-average molecular weight of the polymerizable monomer is a value measured by gel permeation chromatography (GPC).

From the viewpoint of glossiness, the radical-polymerizable monomer preferably includes at least one monomer represented by any of a formula (9) to a formula (12) and more preferably includes at least one monomer represented by the formula (9), the formula (10), or the formula (12).

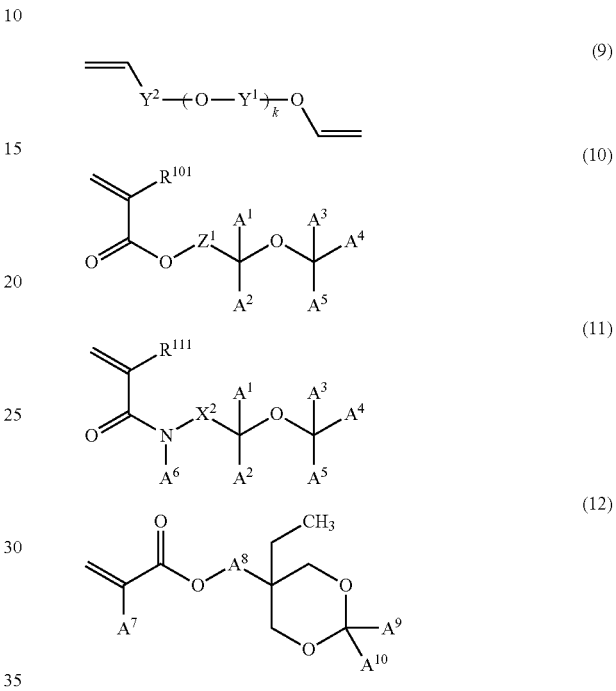

In the formula (9), $Y^1$ at each occurrence independently represents an alkylene group having 1 to 10 carbon atoms, $Y^2$ represents a single bond or a carbonyl group, and k represents an integer of 1 to 3.

In the formula (10) and the formula (11), $A^1$ to $A^6$ each independently represent a hydrogen atom, an alkyl group, an alkoxy group, or $-L^{101}-(OR^{102})_{nA}-R^{103}$, $L^{101}$ represents a single bond or an alkylene group, $R^{101}$ represents a hydrogen atom or a methyl group, $R^{102}$ at each occurrence independently represents an alkylene group, $R^{103}$ represents a hydrogen atom or an alkoxy group, $R^{111}$ represents a hydrogen atom or a methyl group, nA represents an integer of 1 or more, at least one of $A^1$ to $A^5$ represents a hydrogen atom, two of $A^1$ to $A^5$ may be bonded to each other to form a ring, and $Z^1$ and $X^2$ each independently represent an alkylene group, a group in which two or more alkylene groups are combined with one or more ether bonds, or a group in which two or more alkylene groups are combined with one or more ester bonds.

In the formula (12), $A^7$, $A^9$, and $A^{10}$ each independently represent a hydrogen atom, a methyl group, or an ethyl group, and $A^8$ represents a single bond or a divalent linking group.

$Y^1$ in the formula (9) is independently at each occurrence preferably an alkylene group having 2 to 10 carbon atoms, more preferably an alkylene group having 2 to 6 carbon atoms, and still more preferably an alkylene group having 2 or 3 carbon atoms.

$Y^2$ in the formula (9) is preferably a single bond.

In the formula (10) and the formula (11), two of $A^1$ to $A^5$ are preferably bonded to each other to form a ring.

In the formula (10) and the formula (11), $Z^1$ and $X^2$ are preferably each independently an alkylene group or a group in which two or more alkylene groups are combined with one or more ether bonds, more preferably an alkylene group, and particularly preferably a methylene group.

$A^7$ in the formula (12) is preferably a hydrogen atom or a methyl group and more preferably a hydrogen atom.

The divalent linking group in $A^8$ in the formula (12) is not particularly limited as long as the effects of the present disclosure are not significantly impaired, but is preferably a divalent hydrocarbon group or a divalent group in which a hydrocarbon group is combined with an ether bond, and more preferably a divalent hydrocarbon group, a poly(alkyleneoxy) group or a poly(alkyleneoxy)alkyl group. The number of carbon atoms of the divalent linking group is preferably 1 to 60 and more preferably 1 to 20.

$A^8$ in the formula (12) is preferably a single bond, a divalent hydrocarbon group, or a divalent group in which a hydrocarbon group is combined with an ether bond, more preferably a divalent hydrocarbon group having 1 to 20 carbon atoms, still more preferably a divalent hydrocarbon group having 1 to 8 carbon atoms, and particularly preferably a methylene group.

$A^9$ and $A^{10}$ in the formula (12) are preferably each independently a hydrogen atom or a methyl group, and more preferably a hydrogen atom. Still more preferably, $A^9$ and $A^{10}$ are each a hydrogen atom.

From the viewpoint of glossiness, the radical-polymerizable monomer preferably includes at least one monomer selected from the group consisting of cyclic trimethylolpropane formal acrylate (CTFA), tetrahydrofurfuryl acrylate (THFA), and acryloylmorpholine (ACMO) and more preferably includes cyclic trimethylolpropane formal acrylate.

The radical-polymerizable monomer contained in the ink composition according to the present disclosure may be one monomer or two or more monomers.

The radical-polymerizable monomer preferably includes at least one monofunctional radical-polymerizable monomer (also referred to as a "monofunctional monomer" in the present specification).

When the radical-polymerizable monomer includes a monofunctional radical-polymerizable monomer, compatibility between the specific resin and the radical-polymerizable monomer further improves to further improve storage stability and ejection stability.

In the ink composition, the radical-polymerizable monomer preferably includes a polyfunctional radical-polymerizable monomer (also referred to as a "polyfunctional monomer" in the present specification) from the viewpoint of hardness of the resulting film.

The radical-polymerizable monomer includes at least one of a monofunctional radical-polymerizable monomer or a bifunctional radical-polymerizable monomer, and the total content of the monofunctional radical-polymerizable monomer and the bifunctional radical-polymerizable monomer is 50% by mass or more based on the total mass of the photo-curable ink composition. This embodiment provides good glossiness.

Regarding the content of a radical-polymerizable monomer having an acid group in the ink composition according to the present disclosure, the number of moles of the radical-polymerizable monomer having an acid group per 100 g of the photo-curable ink composition is 1.5 mmol or less. From the viewpoint of glossiness, the number of moles of the radical-polymerizable monomer having an acid group is preferably 0.5 mmol or less, more preferably 0.1 mmol or less, and still more preferably 0.01 mmol or less. The ink composition according to the present disclosure particularly preferably includes no radical-polymerizable monomer having an acid group.

In the ink composition according to the present disclosure, from the viewpoint of glossiness, the content of the radical-polymerizable monomer having an acid group in the photo-curable ink composition is preferably 1% by mass or less, more preferably 0.1% by mass or less, and still more preferably 0.01% by mass or less based on the total mass of the ink composition. The photo-curable ink composition particularly preferably includes no radical-polymerizable monomer having an acid group.

The content of the radical-polymerizable monomer having an acid group among the radical-polymerizable monomers is preferably less than 20% by mole relative to the number of moles of the amine moiety in the amine resin included in the photo-curable ink composition. From the viewpoint of glossiness, the content of the radical-polymerizable monomer having an acid group is preferably less than 10% by mole, more preferably less than 2% by mole, still more preferably less than 1% by mole, and particularly preferably 0% by mole, that is, the ink composition according to the present disclosure particularly preferably includes no radical-polymerizable monomer having an acid group.

Within the above range, the function of the amine moiety in the amine resin is not inhibited by acid groups of the radical-polymerizable monomer having an acid group, and an image having good glossiness can be formed.

The number of moles of the amine moiety in the amine resin in the present disclosure is calculated from the amine value described above.

The radical-polymerizable monomer having an acid group in the present disclosure is a radical-polymerizable monomer having a group having a dissociable proton with a pKa of less than 11.

Examples of the group having a dissociable proton with a pKa of less than 11 include a carboxy group, a sulfonic acid group, a phenolic hydroxy group, a phosphoric acid group, a phosphonic acid group, an aminosulfonyl group, an acetylacetonate group, and active imide groups described in paragraphs 0019 to 0043 of JP2005-107112A.

From the viewpoint of glossiness, the ink composition according to the present disclosure particularly preferably includes no radical-polymerizable monomer having a carboxy group.

Specific examples of the radical-polymerizable monomer having an acid group include 2-(meth)acryloxyethyl succinate, methacrylic acid, and monomers shown below.

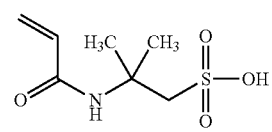

Sulfonic acid group
pKa = 1.67

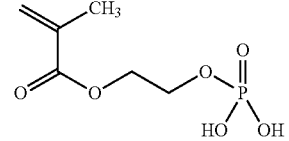

Phosphoric acid group
pKa = 1.78

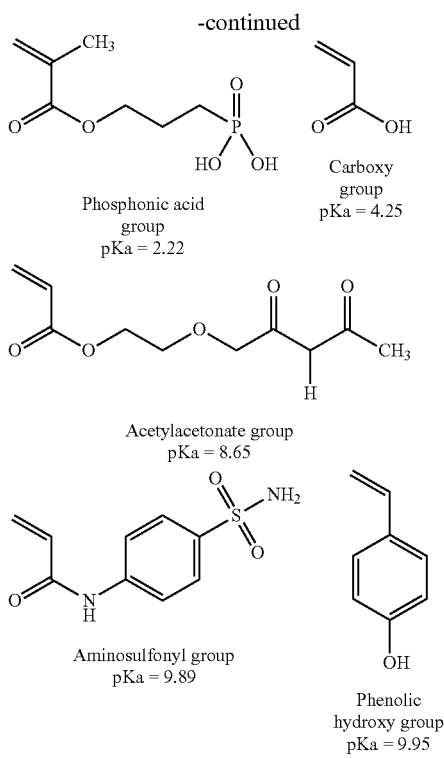

From the viewpoint of glossiness and curability, the content of the radical-polymerizable monomer is preferably 50% by mass or more, more preferably 60% by mass or more, and particularly preferably 65% by mass or more based on the total mass of the ink composition.

The upper limit of the content of the radical-polymerizable monomer is not particularly limited, but is preferably 95% by mass or less and more preferably 90% by mass or less based on the total mass of the ink composition.

Radical-Polymerizable Resin

The ink composition according to the present disclosure may contain a radical-polymerizable resin (hereinafter, also simply referred to as a "polymerizable resin"). In this case, the polymerizable resin contained in the ink composition may be one resin or two or more resins.

When the ink composition according to the present disclosure contains a radical-polymerizable resin, the effect achieved by the constituent unit A (the effect of suppressing the phenomenon in which radical polymerization is inhibited by oxygen) is exerted not only for radical polymerization of the radical-polymerizable monomer but also for radical polymerization of the radical-polymerizable resin.

Herein, the term "polymerizable resin" refers to a resin having a polymerizable group.

The concept of the polymerizable resin covers oligomers having a polymerizable group and polymers having a polymerizable group.

Example of a resin serving as a base of the polymerizable resin include acrylic resins, urethane resins, polyester resins, polyether resins, polycarbonate resins, epoxy resins, and polybutadiene resins. Of these, resins that have both a hard segment and a soft segment and that are capable of relaxing a stress during curing are preferred from the viewpoint of reducing cure shrinkage. In particular, at least one resin selected from the group consisting of urethane resins, polyester resins, and epoxy resins is more preferred.

The polymerizable group included in the polymerizable resin is preferably a group including an ethylenically double bond and more preferably a group including at least one of a vinyl group or a 1-methylvinyl group.

From the viewpoint of polymerization reactivity and hardness of a film to be formed, the polymerizable group is particularly preferably a (meth)acryloyl group.

These polymerizable groups can be introduced into a resin (a polymer or an oligomer) by a polymer reaction or copolymerization.

A polymerizable group can be introduced into a polymer (or an oligomer) by using, for example, a reaction between a polymer (or an oligomer) having a carboxy group in a side chain and glycidyl methacrylate, or a reaction between a polymer (or an oligomer) having an epoxy group and an ethylenically unsaturated group-containing carboxylic acid such as methacrylic acid. These groups may be used in combination.

The polymerizable resins may be commercially available products on the market.

Examples of the commercially available products of an acrylic resin having a polymerizable group include (ACA) Z200M, (ACA)Z230AA, (ACA)Z251, and (ACA)Z254F (all of which are available from DAICEL-ALLNEX LTD.) and HITALOID 7975D (Hitachi Chemical Company, Ltd.).

Examples of the commercially available products of a urethane resin having a polymerizable group include EBECRYL (registered trademark) 8402, EBECRYL (registered trademark) 8405, EBECRYL (registered trademark) 9270, EBECRYL (registered trademark) 8311, EBECRYL (registered trademark) 8701, KRM8667, and KRM8528 (all of which are available from DAICEL-ALLNEX LTD.); CN964, CN9012, CN968, CN996, CN975, and CN9782 (all of which are available from SARTOMER); UV-6300B, UV-7600B, UV-7605B, UV-7620EA, and UV-7630B (all of which are available from The Nippon Synthetic Chemical Industry Co., Ltd.); U-6HA, U-15HA, U-108A, U-200PA, and UA-4200 (all of which are available from Shin Nakamura Chemical Co., Ltd.); TESRACK 2300, HITALOID 4863, TESRACK 2328, TESRACK 2350, and HITALOID 7902-1 (all of which are available from Hitachi Chemical Company, Ltd.), and 8UA-017, 8UA-239, 8UA-239H, 8UA-140, 8UA-585H, 8UA-347H, and 8UX-015A (all of which are available from Taisei Fine Chemical Co., Ltd.).

Examples of the commercially available products of a polyester resin having a polymerizable group include CN294, CN2254, CN2260, CN2271E, CN2300, CN2301, CN2302, CN2303, and CN2304 (all of which are available from SARTOMER); and EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all of which are available from DAICEL-ALLNEX LTD.).

Examples of the commercially available products of a polyether resin having a polymerizable group include BLEMMER (registered trademark) ADE-400A and BLEMMER (registered trademark) ADP-400 (both of which are available from NOF Corporation).

Examples of the commercially available products of a polycarbonate resin having a polymerizable group include polycarbonate diol diacrylate (Ube Industries, Ltd.).

Examples of the commercially available products of an epoxy resin having a polymerizable group include EBECRYL (registered trademark) 3708 (DAICEL-ALLNEX LTD.); CN120, CN120B60, CN120B80, and CN120E50 (all of which are available from SARTOMER); and HITALOID 7851 (Hitachi Chemical Company, Ltd.).

Examples of the commercially available products of a polybutadiene resin having a polymerizable group include CN301, CN303, and CN307 (all of which are available from SARTOMER).

From the viewpoint of combining adhesion and dispersion stability, the weight-average molecular weight of the polymerizable resin is preferably 1,000 or more and 100,000 or less, more preferably 1,000 or more and 40,000 or less, and still more preferably 1,000 or more and 10,000 or less.

The weight-average molecular weight of the polymerizable resin is a value measured by gel permeation chromatography (GPC).

When the ink composition according to the present disclosure contains a polymerizable resin, from the viewpoint of glossiness, the content of the polymerizable resin is preferably 0.1% by mass to 10% by mass, more preferably 0.3% by mass to 5.0% by mass, and particularly preferably 1.0% by mass to 3.0% by mass based on the total mass of the ink composition.

Photopolymerization Initiator

The ink composition according to the present disclosure preferably contains a photopolymerization initiator.

When the ink composition according to the present disclosure contains a photopolymerization initiator, the ink composition may contain one photopolymerization initiator or two or more photopolymerization initiators.

Known photopolymerization initiators that absorb light (that is, active energy rays) to generate radicals, which are polymerization-initiating species, can be used as the photopolymerization initiators.

Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaaryl biimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

As the photopolymerization initiator, the above compounds (a) to (m) may be used alone or in combination of two or more thereof.

Preferred examples of the (a) carbonyl compounds, the (b) acylphosphine oxide compounds, and the (e) thio compounds include compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77 to 117.

More preferred examples thereof include α-thiobenzophenone compounds described in JP1972-6416B (JP-S47-6416B), benzoin ether compounds described in JP1972-3981B (JP-S47-3981B), α-substituted benzoin compounds described in JP1972-22326B (JP-S47-22326B), benzoin derivatives described in JP1972-23664B (JP-S47-23664B), aroyl phosphonates described in JP1982-30704A (JP-S57-30704A), dialkoxy benzophenones described in JP1985-26483B (JP-S60-26483B), benzoin ethers described in JP1985-26403B (JP-S60-26403B) and JP1987-81345A (JP-S62-81345A), α-aminobenzophenones described in JP1989-34242B (JP-H01-34242B), U.S. Pat. No. 4,318,791A, and EP0284561A1, p-di(dimethylaminobenzoyl)benzene described in JP1990-211452A (JP-H02-211452A), thio-substituted aromatic ketones described in JP1986-194062A (JP-S61-194062A), acylphosphine sulfides described in JP1990-9597B (JP-H02-9597B), acylphosphines described in JP1990-9596B (JP-H02-9596B), thioxanthones described in JP1988-61950B (JP-S63-61950B), and coumarins described in JP1984-42864B (JP-S59-42864B).

Furthermore, the polymerization initiators described in JP2008-105379A and JP2009-114290A are also preferred.

From the viewpoint of glossiness, among the above compounds, the (a) carbonyl compounds or the (b) acylphosphine oxide compounds are more preferably included as the photopolymerization initiator. Specific examples thereof include bis(2,4,6-trimethylbenzoyl)phenylphosphine oxide (for example, IRGACURE (registered trademark) 819 manufactured by BASF), 2-(dimethylamino)-1-(4-morpholinophenyl)-2-benzyl-1-butanone (for example, IRGACURE (registered trademark) 369 manufactured by BASF), 2-methyl-1-(4-methylthiophenyl)-2-morpholinopropan-1-one (for example, IRGACURE (registered trademark) 907 manufactured by BASF), 1-hydroxycyclohexylphenylketone (for example, IRGACURE (registered trademark) 184 manufactured by BASF), and 2,4,6-trimethylbenzoyldiphenylphosphine oxide (for example, DAROCUR (registered trademark) TPO and LUCIRIN (registered trademark) TPO (both of which are manufactured by BASF).

Of these, from the viewpoint of, for example, improvement of sensitivity and suitability to LED light, the photopolymerization initiator is preferably an (b) acylphosphine oxide compound and more preferably a monoacylphosphine oxide compound (particularly preferably, 2,4,6-trimethylbenzoyldiphenylphosphine oxide) or a bisacylphosphine oxide compound (particularly preferably, bis(2,4,6-trimethylbenzoyl)phenylphosphine oxide).

When the ink composition according to the present disclosure contains a photopolymerization initiator, the content of the photopolymerization initiator is preferably 0.5% by mass to 15.0% by mass, more preferably 1.0% by mass to 12.0% by mass, and still more preferably 2.0% by mass to 10.0% by mass based on the total mass of the ink composition.

Sensitizer

The ink composition according to the present disclosure preferably contains a sensitizer from the viewpoint of improving sensitivity.

In particular, when LED light is used for curing a film, the ink composition according to the present disclosure preferably contains the photopolymerization initiator described above and a sensitizer.

When the ink composition according to the present disclosure contains a sensitizer, the ink composition may contain one sensitizer or two or more sensitizers.

The sensitizer is a substance that absorbs specific active energy rays to be in an electronically excited state. The sensitizer in the electronically excited state comes in contact with the photopolymerization initiator to cause actions such as electron transfer, energy transfer, and generation of heat. This accelerates a chemical change in the photopolymerization initiator, that is, decomposition, generation of a radical, an acid, or a base, and the like.

Examples of the sensitizer include benzophenone (BP), thioxanthone, isopropylthioxanthone (ITX), ethyl 4-(dimethylamino) benzoate (EDB), anthraquinone, 3-acylcoumarin derivatives, terphenyl, styryl ketone, 3-(aroylmethylene)thiazoline, camphorquinone, eosin, rhodamine, and erythrosine.

In addition, the compound represented by the general formula (i) described in JP2010-24276A and the compound represented by the general formula (I) described in JP1994-107718A (JP-H06-107718A) can also be suitably used as the sensitizer.

Of these, from the viewpoint of glossiness, the sensitizer preferably includes a thioxanthone compound or a benzophenone compound and more preferably includes a thioxanthone compound.

The use of any of these compounds accelerates abstraction of the α-hydrogen of the amino group in the specific resin, enables oxygen inhibition to be further suppressed, and provides better glossiness.

From the viewpoint of suitability to LED light and reactivity with photopolymerization initiators, among the above compounds, at least one selected from the group consisting of thioxanthone, isopropylthioxanthone, and benzophenone is preferred as the sensitizer.

When the ink composition according to the present disclosure contains a sensitizer, the content of the sensitizer is preferably 0.1% by mass to 10% by mass, more preferably 0.3% by mass to 8.0% by mass, and particularly preferably 0.5% by mass to 6.0% by mass based on the total mass of the ink composition.

Surfactant

The ink composition according to the present disclosure may contain a surfactant.

Examples of the surfactant include surfactants described in JP1987-173463A (JP-S62-173463A) and JP1987-183457A (JP-S62-183457A). Examples of the surfactant include anionic surfactants such as dialkyl sulfosuccinates, alkylnaphthalene sulfonates, and fatty acid salts; nonionic surfactants such as polyoxyethylene alkyl ethers, polyoxyethylene alkyl allyl ethers, acetylene glycol, polyoxyethylene-polyoxypropylene block copolymers, and siloxanes such as modified polydimethylsiloxane; cationic surfactants such as alkylamine salts and quaternary ammonium salts; and betaine surfactants such as carbobetaine and sulfobetaine.

Organofluorine compounds having no polymerizable groups may be used instead of the surfactants. The organofluorine compounds are preferably hydrophobic. The organofluorine compounds cover, for example, fluorine-containing surfactants, oily fluorine-containing compounds (e.g., fluorine oil), and solid fluorine compound resins (e.g., a tetrafluoroethylene resin). Examples thereof include the compounds described in JP1982-9053B (JP-S57-9053B) (the 8th column to the 17th column) and JP1987-135826A (JP-S62-135826A).

When the ink composition according to the present disclosure contains a surfactant, the content of the surfactant is preferably 0.01% by mass to 5.0% by mass, more preferably 0.1% by mass to 3.0% by mass, and particularly preferably 0.3% by mass to 2.0% by mass based on the total mass of the ink composition.

Polymerization Inhibitor

The ink composition according to the present disclosure may contain a polymerization inhibitor.

Examples of the polymerization inhibitor include p-methoxyphenol, quinones (such as hydroquinone, benzoquinone, and methoxybenzoquinone), phenothiazine, catechols, alkylphenols (such as dibutylhydroxytoluene (BHT)), alkyl bisphenols, zinc dimethyldithiocarbamate, copper dimethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron A1, and tris(N-nitroso-N-phenylhydroxylamine)aluminum salt.

Of these, at least one selected from the group consisting of p-methoxyphenol, catechols, quinones, alkylphenols, TEMPO, TEMPOL, cupferron A1, and tris(N-nitroso-N-phenylhydroxylamine)aluminum salt is preferred, and at least one selected from the group consisting of p-methoxyphenol, hydroquinone, benzoquinone, BHT, TEMPO, TEMPOL, cupferron A1, and tris(N-nitroso-N-phenylhydroxylamine)aluminum salt is more preferred.

When the ink composition according to the present disclosure contains a polymerization inhibitor, the content of the polymerization inhibitor is preferably 0.01% by mass to 2.0% by mass, more preferably 0.02% by mass to 1.0% by mass, and particularly preferably 0.03% by mass to 0.5% by mass based on the total mass of the ink composition.

Solvent

The ink composition according to the present disclosure may contain a solvent.

Examples of the solvent include ketones such as acetone, methyl ethyl ketone, and diethyl ketone; alcohols such as methanol, ethanol, 2-propanol, 1-propanol, 1-butanol, and tert-butanol; chlorine-based solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether and ethylene glycol dimethyl ether.

When the ink composition according to the present disclosure contains a solvent, from the viewpoint of further reducing the effect on a substrate, the content of the solvent is preferably 5% by mass or less, more preferably 0.01% by mass to 5% by mass, and particularly preferably 0.01% by mass to 3% by mass based on the total mass of the ink composition.

Water

The ink composition according to the present disclosure may contain a trace amount of water as long as the effects of the present invention are not impaired.

However, the ink composition according to the present disclosure is preferably a non-aqueous ink composition, which contains substantially no water, from the viewpoint of more effectively obtaining the effects of the present invention. Specifically, the content of water is preferably 3% by mass or less, more preferably 2% by mass or less, and particularly preferably 1% by mass or less based on the total mass of the ink composition.

Colorant

The ink composition according to the present disclosure may contain at least one colorant.

The ink composition containing a colorant can be suitably used as an ink composition.

The colorant is not particularly limited and can be freely selected from known colorants such as pigments, water-soluble dyes, and disperse dyes and used. Of these colorants, pigments are more preferably contained from the viewpoint of good weather resistance and high color reproducibility.

The pigments are not particularly limited and can be appropriately selected according to the purpose. Examples of the pigments include known organic pigments and inorganic pigments. Examples of the pigments further include resin particles dyed with dyestuff, and commercially available pigment dispersions and surface-treated pigments (for example, dispersions obtained by dispersing a pigment in water, a liquid compound, an insoluble resin, or the like serving as a dispersion medium and pigments having surfaces treated with a resin, a pigment derivative, or the like).

Examples of the organic pigments and the inorganic pigments include yellow pigments, red pigments, magenta pigments, blue pigments, cyan pigments, green pigments, orange pigments, violet pigments, brown pigments, black pigments, and white pigments.

In the case where a pigment is used as the colorant, a pigment dispersing agent may be used as required in preparation of pigment particles.

Regarding the colorants, such as pigments, and the pigment dispersing agents, known publications such as paragraphs 0152 to 0158 of JP2011-225848A and paragraphs 0132 to 0149 of JP2009-209352A can be referred to if necessary.

When the ink composition according to the present disclosure contains a colorant, the content of the colorant is preferably 0.05% by mass to 20% by mass and more preferably 0.2% by mass to 10% by mass based on the total mass of the ink composition.

Antioxidant

The ink composition according to the present disclosure preferably contains an antioxidant.

A known antioxidant can be used as the antioxidant. Examples of the antioxidant include hindered amine compounds, hindered phenol compounds, thioether compounds, phosphoric acid ester compounds, and phosphorous acid ester compounds.

Of these, from the viewpoint of glossiness, a hindered phenol compound having a molecular weight of 1,000 or less or a hindered amine compound having a molecular weight of 1,000 or less is preferably contained as the antioxidant, and a hindered phenol compound having a molecular weight of 1,000 or less is more preferably contained. The above embodiment can suppress yellowing of the resulting image.

Examples of the antioxidant include TINUVIN 123, TINUVIN 144, TINUVIN 292, IRGANOX 1010, IRGANOX 1035, IRGANOX 1076, IRGANOX 1135, IRGANOX 1520L, Irganox 1726 (all of which are manufactured by BASF), and SUMILIZER GP (manufactured by Sumitomo Chemical Co., Ltd.).

When the ink composition according to the present disclosure contains an antioxidant, the content of the antioxidant is preferably 0.01% by mass to 2.0% by mass, more preferably 0.02% by mass to 1.0% by mass, and particularly preferably 0.03% by mass to 0.5% by mass based on the total mass of the ink composition.

Other Components

The ink composition according to the present disclosure may contain components other than the components described above.

Examples of the other components include an ultraviolet absorber, a co-sensitizer, a color-fading inhibitor, and an electroconductive salt.

Regarding the other components, known publications such as JP2011-225848A and JP2009-209352A can be referred to if necessary.

Preferred Physical Properties

The viscosity of the ink composition according to the present disclosure is not particularly limited.

The ink composition according to the present disclosure preferably has a viscosity of 10 mPa·s to 50 mPa·s at 25° C., more preferably has a viscosity of 10 mPa·s to 30 mPa·s at 25° C., and still more preferably has a viscosity of 10 mPa·s to 25 mPa·s at 25° C. The viscosity of the ink composition can be adjusted by, for example, adjusting the compositional ratio of components contained in the ink composition.

Herein, the "viscosity" is a value measured by using a viscometer: VISCOMETER RE-85L (manufactured by Toki Sangyo Co., Ltd.).

A viscosity of the ink composition within the above preferred range enables ejection stability to be further improved, in particular, when the ink composition is used as an ink composition.

The surface tension of the ink composition according to the present disclosure is not particularly limited.

The ink composition according to the present disclosure preferably has a surface tension of 20 mN/m to 30 mN/m at 30° C. and more preferably has a surface tension of 23 mN/m to 28 mN/m at 30° C. When a film is formed on a substrate such as a polyolefin, PET, coated paper, or uncoated paper, the surface tension is preferably 30 mN/m or less from the viewpoint of wettability, and 20 mN/m or more from the viewpoint of permeability and reduction in bleeding.

Herein, the "surface tension" is a value measured by using a surface tensiometer DY-700 (manufactured by Kyowa Interface Science Co., Ltd.).

Method for Forming Image

A method for forming an image according to the present disclosure is a method for forming an image using an ink composition according to the present disclosure. The method is preferably a method for forming an image, the method including an application step of applying an ink composition according to the present disclosure to a recording medium by an ink jet method, and an irradiation step of irradiating the ink composition applied to the recording medium with an active energy ray.

According to the method for forming an image according to the present disclosure, an image having good glossiness can be formed.

Application Step

The application step is a step of applying an ink composition according to the present disclosure to a recording medium.

An embodiment for applying the ink composition to a recording medium is particularly preferably an embodiment in which the ink composition is applied to the recording medium by an ink jet method.

The recording medium is not particularly limited, and, for example, a substrate known as a support or a recording material can be used.

Examples of the substrate include paper, paper laminated with a plastic (such as polyethylene, polypropylene, or polystyrene), metal sheets (such as sheets made of a metal, e.g., aluminum, zinc, or copper), plastic films (such as films made of a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinylacetal, an acrylic resin, or the like), paper laminated with any of the metals, paper on which any of the metals is deposited by vapor deposition, plastic films laminated with any of the metals, and plastic films on which any of the metals is deposited by vapor deposition.

The ink composition according to the present disclosure can form a film having good adhesion to a substrate. Accordingly, the ink composition is particularly suitable when a non-absorbable substrate is used.

The non-absorbable substrate is preferably a plastic substrate such as a polyvinyl chloride (PVC) substrate, a polystyrene (PS) substrate, a polycarbonate (PC) substrate, a polyethylene terephthalate (PET) substrate, a polypropylene (PP) substrate, or an acrylic resin substrate.

The application of the ink composition by the ink jet method can be performed by using a known ink jet recording apparatus.

The ink jet recording apparatus is not particularly limited. A known ink jet recording apparatus capable of achieving a desired resolution can be freely selected and used. Specifically, any known ink jet recording apparatus including a commercially available product can eject the ink composition onto a recording medium in the method for forming an image.

Besides the ink jet method, a known coating method or printing method can also be used for applying the ink composition to a recoding medium in the present disclosure.

The application (coating) of the ink composition by a coating method can be carried out by using a coating device such as a bar coater, a roll coater, a slit coater, or a spin coater.

An example of the ink jet recording apparatus is an apparatus that includes an ink supply system, a temperature sensor, and heating means.

The ink supply system includes, for example, a source tank including an ink composition, a supply line, an ink supply tank arranged on the immediate upstream of an ink jet head, a filter, and a piezoelectric ink jet head. The piezoelectric ink jet head can be driven so that multi-size dots of preferably 1 pL to 100 pL and more preferably 8 pL to 30 pL can be ejected at a resolution of preferably 320 dpi (dot per inch)×320 dpi to 4,000 dpi×4,000 dpi, more preferably 400 dpi×400 dpi to 1,600 dpi×1,600 dpi, and still more preferably 720 dpi×720 dpi to 1,600 dpi×1,600 dpi. The term "dpi" represents the number of dots per 2.54 cm (1 inch).

Irradiation Step

The irradiation step is a step of irradiating the ink composition applied to the recording medium with an active energy ray.

The irradiation of the ink composition applied to the recording medium with active energy rays causes polymerization reaction of the ink composition to proceed, fixes the resulting image, and enables the film hardness and the like of the image to improve.

Examples of the active energy rays that can be used in the irradiation step include ultraviolet rays (UV light), visible rays, and electron beams. Of these, UV light is preferred.

The peak wavelength of the active energy rays (light) is preferably 200 nm to 405 nm, more preferably 220 nm to 390 nm, and still more preferably 220 nm to 385 nm.

A peak wavelength of 200 nm to 310 nm is also preferred, and a peak wavelength of 200 nm to 280 nm is also more preferred.

An exposure surface illuminance during the irradiation with active energy rays (light) is preferably 10 mW/cm$^2$ to 2,000 mW/cm$^2$ and more preferably at 20 mW/cm$^2$ to 1,000 mW/cm$^2$.

Mercury lamps, metal halide lamps, UV fluorescent lamps, gas lasers, solid-state lasers, and the like are widely known as sources for generating the active energy rays (light).

Replacement of the above light sources mentioned as examples by semiconductor ultraviolet light-emitting devices is very useful from the industrial and environmental standpoints.

Of the semiconductor ultraviolet light-emitting devices, LEDs (light emitting diodes) and LDs (laser diodes) have small sizes, enhanced lives, high efficiencies, and low costs and are expected to be the light sources.

The light sources are preferably metal halide lamps, extra-high-pressure mercury lamps, high-pressure mercury lamps, medium-pressure mercury lamps, low-pressure mercury lamps, LEDs, or blue-violet lasers.

Of these, in the case where a sensitizer and a photopolymerization initiator are used in combination, an extra-high-pressure mercury lamp capable of applying light having a wavelength of 365 nm, 405 nm, or 436 nm, a high-pressure mercury lamp capable of applying light having a wavelength of 365 nm, 405 nm, or 436 nm, or an LED capable of applying light having a wavelength of 355 nm, 365 nm, 385 nm, 395 nm, or 405 nm is more preferred, and an LED capable of applying light having a wavelength of 355 nm, 365 nm, 385 nm, 395 nm, or 405 nm is most preferred.

In the irradiation step, the ink composition applied to the recording medium is preferably irradiated with active energy rays for 0.01 seconds to 120 seconds and more preferably 0.1 seconds to 90 seconds.

Regarding irradiation conditions and a basic irradiation method, the irradiation conditions and the irradiation method disclosed in JP1985-132767A (JP-S60-132767A) can be applied in a similar manner.

Specifically, the method for irradiation with active energy rays is preferably a method in which a light source is disposed on both sides of a head unit including a device for ejecting an ink composition, and the head unit and the light sources are scanned by a so-called shuttle method or a method in which irradiation with active energy rays is conducted with a separate light source that is not driven.

The irradiation with the active energy rays is conducted after a certain period of time (preferably 0.01 seconds to 120 seconds and more preferably 0.01 seconds to 60 seconds) after the ink composition is landed, heated, and dried.

Heating Drying Step

The method for forming an image may further optionally have a heating drying step after the application step and before the irradiation step.

Examples of the heating means include, but are not particularly limited to, a heat drum, hot air, an infrared lamp, a hot oven, and heating with a heating plate.

The heating temperature is preferably 40° C. or higher, more preferably 40° C. to 150° C., and still more preferably 40° C. to 80° C.

The heating time can be appropriately determined in consideration of the composition of the ink composition and the printing speed.

The ink composition fixed by heating is further optically fixed by being irradiated with active energy rays in the irradiation step, as required. In the irradiation step, the fixing is preferably conducted by using UV light, as described above.

EXAMPLES

The present invention will now be more specifically described with reference to Examples. It is to be understood that the present invention is not limited to the Examples described below within a scope that does not deviate from the gist of the invention.

In the description below, the number on the lower right side of each constituent unit of a resin (copolymer) indicates a copolymerization ratio (% by mass).

Synthesis of Resin

Synthesis of Specific Resin Used in Example 1A

In a three-necked flask equipped with a condenser, 128.93 parts of methyl propylene glycol (reaction solvent) was weighed and heated at 75° C. under stirring in a nitrogen stream.

A mixed solution separately prepared by mixing 85.95 parts of methyl propylene glycol, 100 parts of 2-(dimethylamino)ethyl methacrylate (1-2) (raw material monomer), 100 parts of n-butyl methacrylate (3-7) (raw material monomer), 5.40 parts of V-601 (dimethyl 2,2'-azobis(2-methylpropionate); initiator manufactured by FUJIFILM Wako Pure Chemical Corporation), and 9.49 parts of dodecyl mercaptan (chain transfer agent) was added dropwise to the flask over a period of four hours. After the completion of the dropwise addition, the resulting mixture was heated at 75° C. for two hours and then further stirred at 90° C. for two hours to react the mixture.

The resulting reaction solution was allowed to cool. The reaction solution after being allowed to cool was poured into 2,000 parts of water, purified by reprecipitation, and then dried under vacuum.

As a result, about 200 parts of a resin (1A) (weight-average molecular weight (Mw) 10,000) having the structure shown below was obtained.

Synthesis of Specific Resins Used in Examples 2A to 22A

Specific resins were each synthesized as in the synthesis of the specific resin used in Example 1A except that the types of monomers serving as raw materials were changed in accordance with the description in Table 6 or 7 below.

Synthesis of Specific Resin Used in Example 23A

In a three-necked flask equipped with a condenser, 128.93 parts of methyl propylene glycol (reaction solvent) was weighed and heated at 75° C. under stirring in a nitrogen stream.

A mixed solution separately prepared by mixing 85.95 parts of methyl propylene glycol, 100 parts of 2-(dimethylamino)ethyl methacrylate (1-2) (raw material monomer), 30 parts of dicyclopentenyloxyethyl acrylate (FA-512M, manufactured by Hitachi Chemical Company, Ltd.) (5-12) (raw material monomer), 40 parts of N-vinylcaprolactam (7-5), 5.40 parts of V-601 (dimethyl 2,2'-azobis(2-methylpropionate); initiator manufactured by FUJIFILM Wako Pure Chemical Corporation), and 4.64 parts of ca-methylstyrene dimer (chain transfer agent) was added dropwise to the flask over a period of four hours. After the completion of the dropwise addition, the resulting mixture was heated at 75° C. for two hours and then further stirred at 90° C. for two hours to react the mixture.

The resulting reaction solution was allowed to cool. The reaction solution after being allowed to cool was poured into 2,000 parts of water, purified by reprecipitation, and then dried under vacuum.

As a result, about 200 parts of a resin (23A) (weight-average molecular weight (Mw) 10,000) having the structure shown below was obtained.

Synthesis of Specific Resin Used in Example 24A

In a three-necked flask equipped with a condenser, 128.93 parts of methyl propylene glycol (reaction solvent) was weighed and heated at 75° C. under stirring in a nitrogen stream.

A mixed solution separately prepared by mixing 85.95 parts of methyl propylene glycol, 100 parts of 2-(dimethylamino)ethyl methacrylate (1-2) (raw material monomer), 30 parts of FA-512M (5-12) (raw material monomer), 40 parts of N-vinylcaprolactam (7-5), 5.40 parts of V-601 (dimethyl 2,2'-azobis(2-methylpropionate); initiator manufactured by FUJIFILM Wako Pure Chemical Corporation), and 8.16 parts of tert-dodecyl mercaptan (chain transfer agent) was added dropwise to the flask over a period of four hours. After the completion of the dropwise addition, the resulting mixture was heated at 75° C. for two hours and then further stirred at 90° C. for two hours to react the mixture.

The resulting reaction solution was allowed to cool. The reaction solution after being allowed to cool was poured into 2,000 parts of water, purified by reprecipitation, and then dried under vacuum.

As a result, about 200 parts of a resin (24A) (weight-average molecular weight (Mw) 10,000) having the structure shown below was obtained.

Synthesis of Specific Resin Used in Example 25A

In a three-necked flask equipped with a condenser, 128.93 parts of methyl propylene glycol (reaction solvent) was weighed and heated at 75° C. under stirring in a nitrogen stream.

A mixed solution separately prepared by mixing 85.95 parts of methyl propylene glycol, 100 parts of 2-(dimethylamino)ethyl methacrylate (1-2) (raw material monomer), 30 parts of FA-512M (5-12) (raw material monomer), 40 parts of N-vinylcaprolactam (7-5), 5.40 parts of V-601 (dimethyl 2,2'-azobis(2-methylpropionate); initiator manufactured by FUJIFILM Wako Pure Chemical Corporation), and 4.36 parts of thioglycerol (chain transfer agent) was added dropwise to the flask over a period of four hours. After the completion of the dropwise addition, the resulting mixture was heated at 75° C. for two hours and then further stirred at 90° C. for two hours to react the mixture.

The resulting reaction solution was allowed to cool. The reaction solution after being allowed to cool was poured into 2,000 parts of water, purified by reprecipitation, and then dried under vacuum.

As a result, about 200 parts of a resin (25A) (weight-average molecular weight (Mw) 10,000) having the structure shown below was obtained.

Synthesis of Specific Resin Used in Example 26A

In a three-necked flask equipped with a condenser, 128.93 parts of methyl propylene glycol (reaction solvent) was weighed and heated at 75° C. under stirring in a nitrogen stream.

A mixed solution separately prepared by mixing 85.95 parts of methyl propylene glycol, 100 parts of 2-(dimethylamino)ethyl methacrylate (1-2) (raw material monomer), 30 parts of FA-512M (5-12) (raw material monomer), 40 parts of N-vinylcaprolactam (7-5), and 12.6 parts of V-601 (dimethyl 2,2'-azobis(2-methylpropionate); initiator manufactured by FUJIFILM Wako Pure Chemical Corporation) was added dropwise to the flask over a period of four hours. After the completion of the dropwise addition, the resulting mixture was heated at 75° C. for two hours and then further stirred at 90° C. for two hours to react the mixture.

The resulting reaction solution was allowed to cool. The reaction solution after being allowed to cool was poured into 2,000 parts of water, purified by reprecipitation, and then dried under vacuum.

49

As a result, about 200 parts of a resin (26A) (weight-average molecular weight (Mw) 10,000) having the structure shown below was obtained.

Synthesis of Specific Resins Used in Examples 27A to 30A

Specific resins were synthesized as in the synthesis of the specific resins used in Examples 23A to 26A except that the types of monomers serving as raw materials were changed in accordance with the description in Table 7 below.

Synthesis of Specific Resins Used in Examples 31A to 38A

Specific resins were each synthesized as in the synthesis of the specific resin used in Example 20A or 9A except that the ratios of monomers serving as raw materials were changed in accordance with the description in Table 7 below.

Synthesis of Specific Resins Used in Examples 39A to 44A

Specific resins were each synthesized as in the synthesis of the specific resin used in Example 20A or 9A except that the amount of the polymerization initiator and the amount of the chain transfer agent were adjusted as follows in accordance with the description in Table 7 or 8 below.

Example 39A

The amount of V-601 was changed to 9.25 parts, and the amount of dodecyl mercaptan was changed to 16.26 parts.

Example 40A

The amount of V-601 was changed to 3.08 parts, and the amount of dodecyl mercaptan was changed to 5.42 parts.

Example 41A

The amount of V-601 was changed to 1.23 parts, and the amount of dodecyl mercaptan was changed to 2.17 parts.

Example 42A

The amount of V-601 was changed to 9.25 parts, and the amount of dodecyl mercaptan was changed to 16.26 parts.

Example 43A

The amount of V-601 was changed to 3.08 parts, and the amount of dodecyl mercaptan was changed to 5.42 parts.

Example 44A

The amount of V-601 was changed to 1.23 parts, and the amount of dodecyl mercaptan was changed to 2.17 parts.

Specific Resins Used in Examples 45A to 74A

Specific resins used in Examples 45A to 74A are each the same as the specific resin used in Example 20A or 9A.

Examples 1A to 75A and Comparative Examples 1 to 5

Preparation of Ink Compositions

Components described in Tables 6 to 9 below were mixed to prepare ink compositions.

The compositions of Ink 1 to Ink 5 described in Tables 6 to 9 are the compositions described in Tables 1 to 5 below, respectively.

In Examples 45A to 50A, the amount of the specific resin was changed as described in Table 8.

In Examples 51A-2 and 52A-2, a polymerization initiator 2 was used in an amount of 3.0% by mass without using a polymerization initiator 1.

In Examples 57A to 60A, TINUVIN 144 or TINUVIN 123 was added as an antioxidant in an amount of 0.1% by mass. The total was adjusted to 100.00% by mass by adjusting the total amount in consideration of the amount of the antioxidant added without changing the ratio of monomers used.

In Examples 69A to 74A and Comparative Examples 2 and 3, a monomer having an acid group (2-acryloyloxyethyl succinate (AES)) was added in an amount described in Table 9 relative to the number of moles of the amine moiety in the amine resin. The total was adjusted to 100.00% by mass by adjusting the total amount in consideration of the amount of AES added without changing the ratio of monomers used.

In Comparative Example 1, no specific resin was used. The total was adjusted to 100.00% by mass by adjusting the total amount in consideration of the amount of specific resin without changing the ratio of monomers used.

In Comparative Example 4, dodecyl mercaptan was used in an amount of 3.00% by mass without using a specific resin.

In Comparative Example 5, polyethyleneimine (EPOMIN SP-200, manufactured by Nippon Shokubai Co., Ltd.) was used in an amount of 3.00% by mass without using a specific resin.

TABLE 1

| Composition of Ink 1 | | |
|---|---|---|
| Monofunctional monomer | CTFA | 29.00% |
| Monofunctional monomer | IBOA | 23.20% |
| Monofunctional monomer | PEA | 28.00% |
| Bifunctional monomer | 3MPDA | 2.00% |
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (mass %) | | 100.00% |

TABLE 2

| Composition of Ink 2 | | |
|---|---|---|
| Monofunctional monomer | THFA | 29.00% |
| Monofunctional monomer | IBOA | 23.20% |
| Monofunctional monomer | PEA | 28.00% |
| Bifunctional monomer | 3MPDA | 2.00% |

TABLE 2-continued

| Composition of Ink 2 | | |
|---|---|---|
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (mass %) | | 100.00% |

TABLE 3

| Composition of Ink 3 | | |
|---|---|---|
| Monofunctional monomer | ACMO | 29.00% |
| Monofunctional monomer | IBOA | 23.20% |
| Monofunctional monomer | PEA | 28.00% |
| Bifunctional monomer | 3MPDA | 2.00% |
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (mass %) | | 100.00% |

TABLE 4

| Composition of Ink 4 | | |
|---|---|---|
| Vinyl monomer | VEEA | 29.00% |
| Monofunctional monomer | IBOA | 23.20% |
| Monofunctional monomer | PEA | 28.00% |
| Bifunctional monomer | 3MPDA | 2.00% |
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (mass %) | | 100.00% |

TABLE 5

| Composition of Ink 5 | | |
|---|---|---|
| Monofunctional monomer | IBOA | 42.20% |
| Monofunctional monomer | PEA | 38.00% |
| Bifunctional monomer | 3MPDA | 2.00% |
| Vinyl monomer | DVE3 | 2.00% |
| Stabilizer | UV-12 | 0.40% |
| Photopolymerization initiator 1 | | 2.00% |
| Photopolymerization initiator 2 | | 1.00% |
| Sensitizer | | 0.80% |
| Pigment dispersion | Cyan millbase | 8.60% |
| Specific resin | | 3.00% |
| Total (mass %) | | 100.00% |

Details of abbreviations in Tables 1 to 5 are described below.

CTFA: Cyclic trimethylolpropane formal acrylate (manufactured by SARTOMER)

THFA: Tetrahydrofurfuryl acrylate (manufactured by SARTOMER)

ACMO: Acryloylmorpholine (manufactured by KJ Chemicals Corporation)

VEEA: 2-(2-Vinyloxyethoxy)ethyl acrylate (manufactured by Nippon Shokubai Co., Ltd.)

IBOA: Isobornyl acrylate (manufactured by SARTOMER)

PEA: 2-Phenoxyethyl acrylate (manufactured by SARTOMER)

3MPDA: 3-Methyl-1,5-pentanediol diacrylate (manufactured by SARTOMER)

DVE3: Triethylene glycol divinyl ether (manufactured by BASF)

UV-12: FLORSTAB UV12, Nitroso-based polymerization inhibitor, tris(N-nitroso-N-phenylhydroxylamine)aluminum salt, manufactured by Kromachem Ltd.

Composition of Cyan Millbase (Cyan Pigment Dispersion)

| | |
|---|---|
| Pigment: C. I. Pigment Blue 15:3 (cyan pigment, manufactured by Clariant): | 20 parts |
| Dispersing agent: Solsperse 32000 (high-molecular-weight dispersing agent, manufactured by The Lubrizol Corporation): | 5 parts |
| Radical-polymerizable monomer: 2-Phenoxyethyl acrylate: | 75 parts |

Evaluation of Ink Composition

Evaluations described below were conducted by using the ink compositions obtained above.

Tables 6 to 9 show the results.

Adhesion of Cured Film

Adhesion was evaluated by using each of the following sample (PVC) for evaluation and sample (PS) for evaluation.

The sample (PVC) for evaluation was prepared as follows.

First, the ink composition obtained above was applied to a polyvinyl chloride (PVC) sheet serving as a substrate by using a No. 2 bar of a K Hand Coater manufactured by RK Print Coat Instruments Ltd. so as to have a thickness of 12 μm, thus obtaining a coating film. The coating film was cured by being irradiated with UV light (ultraviolet rays) by using a laboratory UV mini conveyor device CSOT (manufactured by GS Yuasa Power Supply Ltd.) including an ozoneless metal halide lamp MAN250L and set at a conveyor speed of 9.0 m/min and an exposure intensity of 2.0 W/cm$^2$ to obtain a cured film. The sample (PVC) for evaluation was obtained as described above.

The sample (PS) for evaluation was prepared as in the preparation of the sample (PVC) for evaluation except that the substrate was changed to a polystyrene (PS) sheet.

Here, the following sheets were used as the PVC sheet and the PS sheet.

PVC sheet: "AVERY (registered trademark) 400 GLOSS WHITE PERMANENT" manufactured by Avery Dennison PS sheet: "falcon hi impact polystyrene" manufactured by Robert Horne Group Limited The cured films of the samples for evaluation were subjected to a cross-hatch test in accordance with ISO2409 (cross-cut method) and evaluated in accordance with the evaluation criteria described below.

In this cross-hatch test, cutting was performed at a pitch of 1 mm to form a grid including 25 squares having a side of 1 mm.

In the evaluation criteria described below, 0 and 1 are in a range that is practically acceptable.

In the evaluation criteria described below, the ratio (%) of squares that have flaked is a value calculated by the following formula. In the following formula, the total number of squares is 25.

Ratio (%) of squares that have flaked=[(number of squares that have flaked)/(total number of squares)]×100

Evaluation Criteria of Adhesion of Cured Film

0: The ratio (%) of squares that had flaked was 0%.

1: The ratio (%) of squares that had flaked was more than 0% and 5% or less.

2: The ratio (%) of squares that had flaked was more than 5% and 15% or less.

3: The ratio (%) of squares that had flaked was more than 15% and 35% or less.

4: The ratio (%) of squares that had flaked was more than 35% and 65% or less.

5: The ratio (%) of squares that had flaked was more than 65%.

Blocking Resistance of Cured Film

Blocking resistance of cured films was evaluated by using the above sample (PVC) for evaluation.

The sample (PVC) for evaluation was cut to have a size of 20 mm×20 mm to prepare an evaluation sample. Two evaluation samples each having this structure were prepared.

In the formation of cured films, samples were respectively prepared under two types of exposure conditions below.

Metal halide lamp: An ozoneless metal halide lamp MAN250L was used, and the exposure intensity was set to 2.0 W/cm$^2$.

LED: A laboratory 385-nm UV-LED irradiation device (manufactured by CCS Inc.) was used as an exposure device, and the exposure was conducted under the condition of an exposure energy of 300 mJ/cm$^2$.

Next, the two evaluation samples were stacked such that the cured films were in contact with each other. Subsequently, a load of 10 N was applied for 10 seconds in a direction in which the two evaluation samples were pressed to each other, and the evaluation samples were then peeled off.

Next, each of the cured films of the two evaluation samples was observed. The presence or absence of the trace of bonding between the cured films and the degree of the trace of the bonding were visually observed. Blocking resistance of the cured films was evaluated in accordance with the evaluation criteria described below.

Evaluation Criteria of Blocking Resistance of Cure Films

5: No trace of bonding between the cured films is observed, and blocking resistance of the cured films is very good.

4: A trace of bonding between the cured films is observed in a range of more than 0% and less than 3% of the total area of the cured films. However, the blocking resistance of the cured films is at a level that does not cause any problem in practical application.

3: A trace of bonding between the cured films is observed in a range of 3% or more and less than 10% of the total area of the cured films. However, the blocking resistance of the cured films is within an acceptable range in practical application.

2: A trace of bonding between the cured films is observed in a range of 10% or more and less than 50% of the total area of the cured films. The blocking resistance of the cured films is out of an acceptable range in practical application.

1: A trace of bonding between the cured films is observed in a range of 50% or more of the total area of the cured films. The blocking resistance of the cured films is particularly poor.

Scratch Resistance of Cured Film

A cured film obtained by curing a coating film of an ink composition was subjected to the following scratch test to evaluate scratch resistance of an image obtained by the ink composition. Details will be described below.

The scratch resistance of the cured film was evaluated by using the above sample (PVC) for evaluation.

The cured film of the sample (PVC) for evaluation was subjected to a scratch test under the conditions below. After the test, the form of a scratch on the cured film was visually observed to evaluate scratch resistance of the cured film in accordance with the evaluation criteria described below.

Conditions for Scratch Test

Test standard: ISO1518 (JIS K 5600)

Apparatus: Reciprocating Abraser "Model 5900" manufactured by TABER Industries

Scratching jig: 0.50 mm Scratch Tip for TABER scratch test

Load: 2 N

Scratch speed: 35 mm/s

Number of reciprocating motions of scratching: 5

After the scratch test was performed, the form of a scratch on the cured film was visually observed to evaluate scratch resistance of the cured film in accordance with the evaluation criteria below.

Evaluation Criteria of Scratch Resistance of Cured Film

A: No trace remains on the cured film, and scratch resistance of the cured film is very good.

B: Although a trace remains on the cured film, the cured film is not scraped, and the scratch resistance of the cured film is within an acceptable range in practical application.

C: The surface of the cured film is scraped, and the scratch resistance of the cured film is out of an acceptable range in practical application.

D: The surface of the cured film is scraped to expose the surface of the substrate, and the scratch resistance of the cured film is particularly poor.

Storage Stability of Ink Composition

An ink composition (50 mL) was placed in a 50-mL glass vial, covered with a lid, and left to stand in a thermostatic chamber (60° C.) for four weeks. A viscosity of the ink composition was measured before and after standing in the above manner. A rate of increase of the viscosity after standing relative to the viscosity before standing was determined to evaluate storage stability of the ink composition in accordance with the evaluation criteria described below. In the evaluation criteria below, 5 or 4 is in a range that is practically acceptable.

The viscosity of the ink composition was measured at a liquid temperature of 25° C. by using a VISCOMETER RE-85L (manufactured by Toki Sangyo Co., Ltd.) as a viscometer.

Table 6 to 9 shows the results.

Evaluation Criteria of Storage Stability of Ink Composition

5: The rate of increase of the viscosity after standing relative to the viscosity before standing is less than 10%.

4: The rate of increase of the viscosity after standing relative to the viscosity before standing is 10% or more and less than 20%.

3: The rate of increase of the viscosity after standing relative to the viscosity before standing is 20% or more and less than 30%.

2: The rate of increase of the viscosity after standing relative to the viscosity before standing is 30% or more and less than 40%.

1: The rate of increase of the viscosity after standing relative to the viscosity before standing is 40% or more.

Ejection Stability

Ejection stability of an ink composition (ink) was evaluated by the following method using a commercially available ink jet recording apparatus (manufactured by FUJIFILM Corporation, LuxelJet (registered trademark) UV3600GT/XT: trade name) having a piezoelectric ink ejection head and a PET (polyethylene terephthalate) film (manufactured by Toray Industries, Inc.) serving as a recording medium (substrate), and using the ink composition as ink.

The ink composition (ink) was ejected onto the PET film by using the ink jet recording apparatus under the ejection conditions described below, and the landed ink was irradiated with UV light (irradiation dose: 1,000 mW/cm$^2$) to form a 100% solid image. This operation was continuously conducted for 60 minutes.

The number of nozzles in which ink clogging occurred during the continuous ejection for 60 minutes (nozzle losses) was determined, and ejection stability was evaluated in accordance with the evaluation criteria below. In the evaluation criteria below, 5 or 4 is in a range that is practically acceptable.

Ejection Conditions
  Number of channels: 318/head
  Driving frequency: 4.8 kHz/dot
  Ink droplet: 7 droplets, 42 pL
  Temperature of head nozzle: 45° C.

Evaluation Criteria of Ejection Stability of Ink Composition
  5: The number of nozzle losses is 0 or more and less than 2.
  4: The number of nozzle losses is 2 or more and less than 5.
  3: The number of nozzle losses is 5 or more and less than 7.
  2: The number of nozzle losses is 7 or more and less than 10.
  1: The number of nozzle losses is 10 or more.

Glossiness

Glossiness of a 100% solid image obtained by the same operation as that in the evaluation of ejection stability of an ink composition was measured with a glossmeter "GM-268Plus" manufactured by Konica Minolta, Inc. at a measurement angle of 60 degrees. The glossiness of a cured film was evaluated on the basis of the measurement result in accordance with the criteria below. The "GU" below represents an abbreviation of Gloss Unit.

Evaluation Criteria of Gloss
  5: The glossiness is 25 GU (Gloss Unit) or more.
  4: The glossiness is 20 GU or more and less than 25 GU.
  3: The glossiness is 15 GU or more and less than 20 GU.
  2: The glossiness is 10 GU or more and less than 15 GU.
  1: The glossiness is less than 10 GU.

Yellowing of Image

Yellowing of an image was evaluated by using a 100% solid image obtained by the same operation as that in the evaluation of ejection stability of an ink composition.

More specifically, immediately after the formation of the image (within 30 minutes from the formation of the image) and after three days from the formation of the image, a color (L*a*b*) of the image was measured with a spectrophotometer SpectroEye manufactured by X-Rite Inc. to determine a color difference (ΔE) between the two colors.

Yellowing of the image was evaluated on the basis of the value of ΔE in accordance with the evaluation criteria described below.

Evaluation Criteria of Yellowing of Image
  5: The value of ΔE was 0 or more and less than 0.4, and yellowing of the image did not cause any problem in practical application.
  4: The value of ΔE was 0.4 or more and less than 1.6, and yellowing of the image did not cause any problem in practical application.
  3: The value of ΔE was 1.6 or more and less than 3.2, and yellowing of the image did not cause any problem in practical application.
  2: The value of ΔE was 3.2 or more and less than 4.8, and yellowing of the image was out of an acceptable range in practical application.
  1: The value of ΔE was 4.8 or more, and yellowing of the image was out of an acceptable range in practical application.

TABLE 6

| | Specific resin | | | | | | | |
|---|---|---|---|---|---|---|---|---|
| | Constituent unit | | | | Mass ratio | | | |
| | Constituent unit A | Constituent unit B1 | Constituent unit B2 | Terminal | Constituent unit A | Constituent unit B1 | Constituent unit B2 | Amine value (mmol/g) |
| Example 1A | (1-2) | (3-7) | — | (8-4) | 50 | 50 | 0 | 3.18 |
| Example 2A | (1-9) | (3-7) | — | (8-4) | 50 | 50 | 0 | 3.52 |
| Example 3A | (1-11) | (5-2) | — | (8-4) | 50 | 50 | 0 | 2.53 |
| Example 4A | (1-11) | (6-3) | — | (8-4) | 50 | 50 | 0 | 2.53 |
| Example 5A | (1-9) | (7-3) | — | (8-4) | 50 | 50 | 0 | 3.52 |
| Example 6A | (1-2) | (5-2) | — | (8-4) | 50 | 50 | 0 | 3.18 |
| Example 7A | (1-2) | (6-3) | — | (8-4) | 50 | 50 | 0 | 3.18 |
| Example 8A | (1-11) | (3-7) | — | (8-4) | 50 | 50 | 0 | 2.53 |
| Example 9A | (1-14) | (3-7) | — | (8-4) | 50 | 50 | 0 | 2.09 |
| Example 10A | (1-14) | (3-1) | — | (8-4) | 50 | 50 | 0 | 2.09 |
| Example 11A | (1-14) | (3-11) | — | (8-4) | 50 | 50 | 0 | 2.09 |
| Example 12A | (1-14) | (4-9) | — | (8-4) | 50 | 50 | 0 | 2.09 |
| Example 13A | (1-14) | (4-11) | — | (8-4) | 50 | 50 | 0 | 2.09 |
| Example 14A | (1-2) | (5-9) | — | (8-4) | 50 | 50 | 0 | 3.18 |
| Example 15A | (1-2) | (5-10) | — | (8-4) | 50 | 50 | 0 | 3.18 |
| Example 16A | (1-2) | (5-12) | — | (8-4) | 50 | 50 | 0 | 3.18 |
| Example 17A | (1-2) | (6-10) | — | (8-4) | 50 | 50 | 0 | 3.18 |

TABLE 6-continued

| | | | | | | | | |
|---|---|---|---|---|---|---|---|---|
| Example 18A | (1-2) | (6-12) | — | (8-4) | 50 | 50 | 0 | 3.18 |
| Example 19A | (1-2) | (7-5) | — | (8-4) | 50 | 50 | 0 | 3.18 |
| Example 20A | (1-2) | (5-12) | (7-5) | (8-4) | 50 | 30 | 20 | 3.18 |

| | Specific resin | | Amount of amine in 100 g of composition (mmol) | Photopolymerization initiator 1 | Photopolymerization initiator 2 |
|---|---|---|---|---|---|
| | Mw | Content based on total amount of composition (mass %) | | | |
| Example 1A | 10,000 | 3.0 | 9.5 | Irgacure 819 | Irgacure 184 |
| Example 2A | 10,000 | 3.0 | 10.5 | Irgacure 819 | Irgacure 184 |
| Example 3A | 10,000 | 3.0 | 7.6 | Irgacure 819 | Irgacure 184 |
| Example 4A | 10,000 | 3.0 | 7.6 | Irgacure 819 | Irgacure 184 |
| Example 5A | 10,000 | 3.0 | 10.5 | Irgacure 819 | Irgacure 184 |
| Example 6A | 10,000 | 3.0 | 9.5 | Irgacure 819 | Irgacure 184 |
| Example 7A | 10,000 | 3.0 | 9.5 | Irgacure 819 | Irgacure 184 |
| Example 8A | 10,000 | 3.0 | 7.6 | Irgacure 819 | Irgacure 184 |
| Example 9A | 10,000 | 3.0 | 6.3 | Irgacure 819 | Irgacure 184 |
| Example 10A | 10,000 | 3.0 | 6.3 | Irgacure 819 | Irgacure 184 |
| Example 11A | 10,000 | 3.0 | 6.3 | Irgacure 819 | Irgacure 184 |
| Example 12A | 10,000 | 3.0 | 6.3 | Irgacure 819 | Irgacure 184 |
| Example 13A | 10,000 | 3.0 | 6.3 | Irgacure 819 | Irgacure 184 |
| Example 14A | 10,000 | 3.0 | 9.5 | Irgacure 819 | Irgacure 184 |
| Example 15A | 10,000 | 3.0 | 9.5 | Irgacure 819 | Irgacure 184 |
| Example 16A | 10,000 | 3.0 | 9.5 | Irgacure 819 | Irgacure 184 |
| Example 17A | 10,000 | 3.0 | 9.5 | Irgacure 819 | Irgacure 184 |
| Example 18A | 10,000 | 3.0 | 9.5 | Irgacure 819 | Irgacure 184 |
| Example 19A | 10,000 | 3.0 | 9.5 | Irgacure 819 | Irgacure 184 |
| Example 20A | 10,000 | 3.0 | 9.5 | Irgacure 819 | Irgacure 184 |

| | Sensitizer | Antioxidant | Radical-polymerizable monomer having acid group | Amount of radical-polymerizable monomer having acid group in 100 g of composition (mmol) | Ink composition | Light source (Metal halide lamp) | |
|---|---|---|---|---|---|---|---|
| | | | | | | Blocking resistance | Scratch resistance |
| Example 1A | ITX | — | — | 0.000 | Ink 1 | 4 | 4 |
| Example 2A | ITX | — | — | 0.000 | Ink 1 | 4 | 4 |
| Example 3A | ITX | — | — | 0.000 | Ink 1 | 4 | 4 |
| Example 4A | ITX | — | — | 0.000 | Ink 1 | 4 | 4 |
| Example 5A | ITX | — | — | 0.000 | Ink 1 | 4 | 4 |
| Example 6A | ITX | — | — | 0.000 | Ink 1 | 5 | 4 |
| Example 7A | ITX | — | — | 0.000 | Ink 1 | 5 | 4 |
| Example 8A | ITX | — | — | 0.000 | Ink 1 | 5 | 4 |
| Example 9A | ITX | — | — | 0.000 | Ink 1 | 5 | 5 |
| Example 10A | ITX | — | — | 0.000 | Ink 1 | 5 | 5 |
| Example 11A | ITX | — | — | 0.000 | Ink 1 | 5 | 5 |
| Example 12A | ITX | — | — | 0.000 | Ink 1 | 5 | 5 |
| Example 13A | ITX | — | — | 0.000 | Ink 1 | 5 | 5 |
| Example 14A | ITX | — | — | 0.000 | Ink 1 | 5 | 5 |
| Example 15A | ITX | — | — | 0.000 | Ink 1 | 5 | 5 |
| Example 16A | ITX | — | — | 0.000 | Ink 1 | 5 | 5 |
| Example 17A | ITX | — | — | 0.000 | Ink 1 | 5 | 5 |
| Example 18A | ITX | — | — | 0.000 | Ink 1 | 5 | 5 |
| Example 19A | ITX | — | — | 0.000 | Ink 1 | 5 | 5 |
| Example 20A | ITX | — | — | 0.000 | Ink 1 | 5 | 5 |

| | Light source (Metal halide lamp) | | | | | Light source (LED) | |
|---|---|---|---|---|---|---|---|
| | Adhesion | | Storage stability | Ejection stability | Glossiness | Yellowing | Blocking resistance | Scratch resistance |
| | PVC | Styrene | | | | | | |
| Example 1A | 1 | 1 | 5 | 5 | 4 | 4 | 3 | 3 |
| Example 2A | 1 | 1 | 5 | 4 | 4 | 4 | 3 | 3 |
| Example 3A | 1 | 1 | 5 | 5 | 4 | 4 | 3 | 3 |
| Example 4A | 1 | 1 | 5 | 4 | 4 | 4 | 3 | 3 |
| Example 5A | 1 | 1 | 5 | 4 | 4 | 4 | 3 | 3 |
| Example 6A | 0 | 1 | 5 | 5 | 5 | 4 | 4 | 3 |
| Example 7A | 0 | 1 | 5 | 4 | 5 | 4 | 4 | 3 |
| Example 8A | 0 | 1 | 5 | 5 | 5 | 4 | 4 | 3 |
| Example 9A | 0 | 0 | 5 | 5 | 5 | 4 | 4 | 4 |
| Example 10A | 0 | 0 | 5 | 5 | 5 | 4 | 4 | 4 |
| Example 11A | 0 | 0 | 5 | 5 | 5 | 4 | 4 | 4 |
| Example 12A | 0 | 0 | 5 | 5 | 5 | 4 | 4 | 4 |

TABLE 6-continued

|  | | | | | | | | |
|---|---|---|---|---|---|---|---|---|
| Example 13A | 0 | 0 | 5 | 5 | 5 | 4 | 4 | 4 |
| Example 14A | 0 | 0 | 5 | 5 | 5 | 4 | 4 | 4 |
| Example 15A | 0 | 0 | 5 | 5 | 5 | 4 | 4 | 4 |
| Example 16A | 0 | 0 | 5 | 5 | 5 | 4 | 4 | 4 |
| Example 17A | 0 | 0 | 5 | 5 | 5 | 4 | 4 | 4 |
| Example 18A | 0 | 0 | 5 | 5 | 5 | 4 | 4 | 4 |
| Example 19A | 0 | 0 | 5 | 5 | 5 | 4 | 4 | 4 |
| Example 20A | 0 | 0 | 5 | 5 | 5 | 4 | 5 | 5 |

TABLE 7

| | Specific resin | | | | | | | |
|---|---|---|---|---|---|---|---|---|
| | Constituent unit | | | | Mass ratio | | | |
| | Constituent unit A | Constituent unit B1 | Constituent unit B2 | Terminal | Constituent unit A | Constituent unit B1 | Constituent unit B2 | Amine value (mmol/g) |
| Example 21A | (1-4) | (5-12) | (7-5) | (8-4) | 50 | 30 | 20 | 2.70 |
| Example 22A | (1-6) | (5-12) | (7-5) | (8-4) | 50 | 30 | 20 | 2.34 |
| Example 23A | (1-2) | (5-12) | (7-5) | (8-1) | 50 | 30 | 20 | 3.18 |
| Example 24A | (1-2) | (5-12) | (7-5) | (8-6) | 50 | 30 | 20 | 3.18 |
| Example 25A | (1-2) | (5-12) | (7-5) | (8-7) | 50 | 30 | 20 | 3.18 |
| Example 26A | (1-2) | (5-12) | (7-5) | (8-15) | 50 | 30 | 20 | 3.18 |
| Example 27A | (1-14) | (3-7) | — | (8-1) | 50 | 50 | 0 | 2.09 |
| Example 28A | (1-14) | (3-7) | — | (8-6) | 50 | 50 | 0 | 2.09 |
| Example 29A | (1-14) | (3-7) | — | (8-7) | 50 | 50 | 0 | 2.09 |
| Example 30A | (1-14) | (3-7) | — | (8-15) | 50 | 50 | 0 | 2.09 |
| Example 31A | (1-2) | (5-12) | (7-5) | (8-4) | 5 | 70 | 25 | 0.32 |
| Example 32A | (1-2) | (5-12) | (7-5) | (8-4) | 15 | 60 | 25 | 0.95 |
| Example 33A | (1-2) | (5-12) | (7-5) | (8-4) | 40 | 40 | 20 | 2.54 |
| Example 34A | (1-2) | (5-12) | (7-5) | (8-4) | 80 | 10 | 10 | 5.09 |
| Example 35A | (1-14) | (3-7) | — | (8-4) | 5 | 95 | 0 | 0.21 |
| Example 36A | (1-14) | (3-7) | — | (8-4) | 15 | 85 | 0 | 0.63 |
| Example 37A | (1-14) | (3-7) | — | (8-4) | 40 | 60 | 0 | 1.67 |
| Example 38A | (1-14) | (3-7) | — | (8-4) | 90 | 10 | 0 | 3.76 |
| Example 39A | (1-2) | (5-12) | (7-5) | (8-4) | 50 | 30 | 20 | 3.18 |
| Example 40A | (1-2) | (5-12) | (7-5) | (8-4) | 50 | 30 | 20 | 3.18 |

| | Specific resin | | | | |
|---|---|---|---|---|---|
| | Mw | Content based on total amount of composition (mass %) | Amount of amine in 100 g of composition (mmol) | Photopolymerization initiator 1 | Photopolymerization initiator 2 |
| Example 21A | 10,000 | 3.0 | 8.1 | Irgacure 819 | Irgacure 184 |
| Example 22A | 10,000 | 3.0 | 7.0 | Irgacure 819 | Irgacure 184 |
| Example 23A | 10,000 | 3.0 | 9.5 | Irgacure 819 | Irgacure 184 |
| Example 24A | 10,000 | 3.0 | 9.5 | Irgacure 819 | Irgacure 184 |
| Example 25A | 10,000 | 3.0 | 9.5 | Irgacure 819 | Irgacure 184 |
| Example 26A | 10,000 | 3.0 | 9.5 | Irgacure 819 | Irgacure 184 |
| Example 27A | 10,000 | 3.0 | 6.3 | Irgacure 819 | Irgacure 184 |
| Example 28A | 10,000 | 3.0 | 6.3 | Irgacure 819 | Irgacure 184 |
| Example 29A | 10,000 | 3.0 | 6.3 | Irgacure 819 | Irgacure 184 |
| Example 30A | 10,000 | 3.0 | 6.3 | Irgacure 819 | Irgacure 184 |
| Example 31A | 10,000 | 3.0 | 1.0 | Irgacure 819 | Irgacure 184 |
| Example 32A | 10,000 | 3.0 | 2.9 | Irgacure 819 | Irgacure 184 |
| Example 33A | 10,000 | 3.0 | 7.6 | Irgacure 819 | Irgacure 184 |
| Example 34A | 10,000 | 3.0 | 15.3 | Irgacure 819 | Irgacure 184 |
| Example 35A | 10,000 | 3.0 | 0.6 | Irgacure 819 | Irgacure 184 |
| Example 36A | 10,000 | 3.0 | 1.9 | Irgacure 819 | Irgacure 184 |
| Example 37A | 10,000 | 3.0 | 5.0 | Irgacure 819 | Irgacure 184 |
| Example 38A | 10,000 | 3.0 | 11.3 | Irgacure 819 | Irgacure 184 |
| Example 39A | 4,000 | 3.0 | 9.5 | Irgacure 819 | Irgacure 184 |
| Example 40A | 20,000 | 3.0 | 9.5 | Irgacure 819 | Irgacure 184 |

TABLE 7-continued

|  | Sensitizer | Antioxidant | Radical-polymerizable monomer having acid group | Amount of radical-polymerizable monomer having acid group in 100 g of composition (mmol) | Ink composition | Light source (Metal halide lamp) Blocking resistance | Scratch resistance |
|---|---|---|---|---|---|---|---|
| Example 21A | ITX | — | — | 0.000 | Ink 1 | 5 | 5 |
| Example 22A | ITX | — | — | 0.000 | Ink 1 | 5 | 5 |
| Example 23A | ITX | — | — | 0.000 | Ink 1 | 5 | 5 |
| Example 24A | ITX | — | — | 0.000 | Ink 1 | 5 | 5 |
| Example 25A | ITX | — | — | 0.000 | Ink 1 | 5 | 5 |
| Example 26A | ITX | — | — | 0.000 | Ink 1 | 5 | 5 |
| Example 27A | ITX | — | — | 0.000 | Ink 1 | 5 | 5 |
| Example 28A | ITX | — | — | 0.000 | Ink 1 | 5 | 5 |
| Example 29A | ITX | — | — | 0.000 | Ink 1 | 5 | 5 |
| Example 30A | ITX | — | — | 0.000 | Ink 1 | 5 | 5 |
| Example 31A | ITX | — | — | 0.000 | Ink 1 | 4 | 5 |
| Example 32A | ITX | — | — | 0.000 | Ink 1 | 5 | 5 |
| Example 33A | ITX | — | — | 0.000 | Ink 1 | 5 | 5 |
| Example 34A | ITX | — | — | 0.000 | Ink 1 | 5 | 5 |
| Example 35A | ITX | — | — | 0.000 | Ink 1 | 4 | 5 |
| Example 36A | ITX | — | — | 0.000 | Ink 1 | 5 | 5 |
| Example 37A | ITX | — | — | 0.000 | Ink 1 | 5 | 5 |
| Example 38A | ITX | — | — | 0.000 | Ink 1 | 5 | 5 |
| Example 39A | ITX | — | — | 0.000 | Ink 1 | 5 | 4 |
| Example 40A | ITX | — | — | 0.000 | Ink 1 | 5 | 5 |

|  | Light source (Metal halide lamp) | | | | | | Light source (LED) | |
|---|---|---|---|---|---|---|---|---|
|  | Adhesion | | Storage stability | Ejection stability | Glossiness | Yellowing | Blocking resistance | Scratch resistance |
|  | PVC | Styrene | | | | | | |
| Example 21A | 0 | 0 | 5 | 5 | 5 | 4 | 5 | 5 |
| Example 22A | 0 | 0 | 5 | 5 | 5 | 4 | 5 | 5 |
| Example 23A | 0 | 0 | 5 | 5 | 4 | 4 | 5 | 5 |
| Example 24A | 0 | 0 | 5 | 5 | 5 | 4 | 5 | 5 |
| Example 25A | 0 | 0 | 5 | 5 | 4 | 4 | 5 | 5 |
| Example 26A | 0 | 0 | 5 | 5 | 4 | 4 | 5 | 5 |
| Example 27A | 0 | 0 | 5 | 5 | 4 | 4 | 4 | 4 |
| Example 28A | 0 | 0 | 5 | 5 | 5 | 4 | 4 | 4 |
| Example 29A | 0 | 0 | 5 | 5 | 4 | 4 | 4 | 4 |
| Example 30A | 0 | 0 | 5 | 5 | 4 | 4 | 4 | 4 |
| Example 31A | 0 | 0 | 4 | 5 | 5 | 4 | 4 | 4 |
| Example 32A | 0 | 0 | 5 | 5 | 5 | 4 | 5 | 5 |
| Example 33A | 0 | 0 | 5 | 5 | 5 | 4 | 5 | 5 |
| Example 34A | 0 | 0 | 4 | 5 | 5 | 4 | 5 | 5 |
| Example 35A | 0 | 0 | 5 | 5 | 5 | 4 | 3 | 4 |
| Example 36A | 0 | 0 | 5 | 5 | 5 | 4 | 4 | 4 |
| Example 37A | 0 | 0 | 5 | 5 | 5 | 4 | 4 | 4 |
| Example 38A | 0 | 0 | 4 | 5 | 5 | 4 | 4 | 4 |
| Example 39A | 0 | 0 | 5 | 5 | 5 | 4 | 4 | 4 |
| Example 40A | 0 | 0 | 5 | 5 | 5 | 4 | 5 | 5 |

TABLE 8

|  | Specific resin | | | | | | |
|---|---|---|---|---|---|---|---|
|  | Constituent unit | | | | Mass ratio | | |
|  | Constituent unit A | Constituent unit B1 | Constituent unit B2 | Terminal | Constituent unit A | Constituent unit B1 | Constituent unit B2 |
| Example 41A | (1-2) | (5-12) | (7-5) | (8-4) | 50 | 30 | 20 |
| Example 42A | (1-14) | (3-7) | — | (8-4) | 50 | 50 | 0 |
| Example 43A | (1-14) | (3-7) | — | (8-4) | 50 | 50 | 0 |
| Example 44A | (1-14) | (3-7) | — | (8-4) | 50 | 50 | 0 |
| Example 45A | (1-2) | (5-12) | (7-5) | (8-4) | 50 | 30 | 20 |
| Example 46A | (1-2) | (5-12) | (7-5) | (8-4) | 50 | 30 | 20 |
| Example 47A | (1-2) | (5-12) | (7-5) | (8-4) | 50 | 30 | 20 |
| Example 48A | (1-14) | (3-7) | — | (8-4) | 50 | 50 | 0 |
| Example 49A | (1-14) | (3-7) | — | (8-4) | 50 | 50 | 0 |
| Example 50A | (1-14) | (3-7) | — | (8-4) | 50 | 50 | 0 |
| Example 51A-1 | (1-2) | (5-12) | (7-5) | (8-4) | 50 | 30 | 20 |

TABLE 8-continued

| | | | | | | | |
|---|---|---|---|---|---|---|---|
| Example 52A-1 | (1-14) | (3-7) | — | (8-4) | 50 | 50 | 0 |
| Example 51A-2 | (1-2) | (5-12) | (7-5) | (8-4) | 50 | 30 | 20 |
| Example 52A-2 | (1-14) | (3-7) | — | (8-4) | 50 | 50 | 0 |
| Example 53A | (1-2) | (5-12) | (7-5) | (8-4) | 50 | 30 | 20 |
| Example 54A | (1-2) | (5-12) | (7-5) | (8-4) | 50 | 30 | 20 |
| Example 55A | (1-14) | (3-7) | — | (8-4) | 50 | 50 | 0 |
| Example 56A | (1-14) | (3-7) | — | (8-4) | 50 | 50 | 0 |
| Example 57A | (1-2) | (5-12) | (7-5) | (8-4) | 50 | 30 | 20 |
| Example 58A | (1-2) | (5-12) | (7-5) | (8-4) | 50 | 30 | 20 |
| Example 59A | (1-14) | (3-7) | — | (8-4) | 50 | 50 | 0 |
| Example 60A | (1-14) | (3-7) | — | (8-4) | 50 | 50 | 0 |

| | Specific resin | | | | |
|---|---|---|---|---|---|
| | Amine value (mmol/g) | Mw | Content based on total amount of composition (mass %) | Amount of amine in 100 g of composition (mmol) | Photopolymerization initiator 1 | Photopolymerization initiator 2 |
| Example 41A | 3.18 | 50,000 | 3.0 | 9.5 | Irgacure 819 | Irgacure 184 |
| Example 42A | 2.09 | 4,000 | 3.0 | 6.3 | Irgacure 819 | Irgacure 184 |
| Example 43A | 2.09 | 20,000 | 3.0 | 6.3 | Irgacure 819 | Irgacure 184 |
| Example 44A | 2.09 | 50,000 | 3.0 | 6.3 | Irgacure 819 | Irgacure 184 |
| Example 45A | 3.18 | 10,000 | 0.5 | 1.6 | Irgacure 819 | Irgacure 184 |
| Example 46A | 3.18 | 10,000 | 6.0 | 19.1 | Irgacure 819 | Irgacure 184 |
| Example 47A | 3.18 | 10,000 | 10.0 | 31.8 | Irgacure 819 | Irgacure 184 |
| Example 48A | 2.09 | 10,000 | 0.5 | 1.0 | Irgacure 819 | Irgacure 184 |
| Example 49A | 2.09 | 10,000 | 6.0 | 12.5 | Irgacure 819 | Irgacure 184 |
| Example 50A | 2.09 | 10,000 | 10.0 | 20.9 | Irgacure 819 | Irgacure 184 |
| Example 51A-1 | 3.18 | 10,000 | 3.0 | 9.5 | Irgacure 819 | Irgacure 270 |
| Example 52A-1 | 2.09 | 10,000 | 3.0 | 6.3 | Irgacure 819 | Irgacure 270 |
| Example 51A-2 | 3.18 | 10,000 | 3.0 | 9.5 | — | Irgacure 184 |
| Example 52A-2 | 2.09 | 10,000 | 3.0 | 6.3 | — | Irgacure 184 |
| Example 53A | 3.18 | 10,000 | 3.0 | 9.5 | Irgacure 819 | Irgacure 184 |
| Example 54A | 3.18 | 10,000 | 3.0 | 9.5 | Irgacure 819 | Irgacure 184 |
| Example 55A | 2.09 | 10,000 | 3.0 | 6.3 | Irgacure 819 | Irgacure 184 |
| Example 56A | 2.09 | 10,000 | 3.0 | 6.3 | Irgacure 819 | Irgacure 184 |
| Example 57A | 3.18 | 10,000 | 3.0 | 9.5 | Irgacure 819 | Irgacure 184 |
| Example 58A | 3.18 | 10,000 | 3.0 | 9.5 | Irgacure 819 | Irgacure 184 |
| Example 59A | 2.09 | 10,000 | 3.0 | 6.3 | Irgacure 819 | Irgacure 184 |
| Example 60A | 3.18 | 10,000 | 3.0 | 9.5 | Irgacure 819 | Irgacure 184 |

| | Sensitizer | Antioxidant | Radical-polymerizable monomer having acid group | Amount of radical-polymerizable monomer having acid group in 100 g of composition (mmol) | Ink composition |
|---|---|---|---|---|---|
| Example 41A | ITX | — | — | 0.000 | Ink 1 |
| Example 42A | ITX | — | — | 0.000 | Ink 1 |
| Example 43A | ITX | — | — | 0.000 | Ink 1 |
| Example 44A | ITX | — | — | 0.000 | Ink 1 |
| Example 45A | ITX | — | — | 0.000 | Ink 1 |
| Example 46A | ITX | — | — | 0.000 | Ink 1 |
| Example 47A | ITX | — | — | 0.000 | Ink 1 |
| Example 48A | ITX | — | — | 0.000 | Ink 1 |
| Example 49A | ITX | — | — | 0.000 | Ink 1 |
| Example 50A | ITX | — | — | 0.000 | Ink 1 |
| Example 51A-1 | ITX | — | — | 0.000 | Ink 1 |
| Example 52A-1 | ITX | — | — | 0.000 | Ink 1 |
| Example 51A-2 | ITX | — | — | 0.000 | Ink 1 |
| Example 52A-2 | ITX | — | — | 0.000 | Ink 1 |
| Example 53A | — | — | — | 0.000 | Ink 1 |
| Example 54A | BP | — | — | 0.000 | Ink 1 |
| Example 55A | — | — | — | 0.000 | Ink 1 |
| Example 56A | BP | — | — | 0.000 | Ink 1 |

TABLE 8-continued

| | | | | | |
|---|---|---|---|---|---|
| Example 57A | ITX | TINUVIN 144 | — | 0.000 | Ink 1 |
| Example 58A | ITX | TINUVIN 123 | — | 0.000 | Ink 1 |
| Example 59A | ITX | TINUVIN 144 | — | 0.000 | Ink 1 |
| Example 60A | ITX | TINUVIN 123 | — | 0.000 | Ink 1 |

| | Light source (Metal halide lamp) | | | | | | | Light source (LED) | |
|---|---|---|---|---|---|---|---|---|---|
| | Blocking resistance | Scratch resistance | Adhesion PVC | Adhesion Styrene | Storage stability | Ejection stability | Glossiness | Yellowing | Blocking resistance | Scratch resistance |
| Example 41A | 5 | 5 | 0 | 0 | 5 | 4 | 5 | 4 | 5 | 5 |
| Example 42A | 5 | 4 | 0 | 0 | 5 | 5 | 5 | 4 | 4 | 3 |
| Example 43A | 5 | 5 | 0 | 0 | 5 | 5 | 5 | 4 | 4 | 4 |
| Example 44A | 5 | 5 | 0 | 0 | 5 | 4 | 5 | 4 | 4 | 4 |
| Example 45A | 5 | 4 | 0 | 0 | 5 | 5 | 5 | 4 | 4 | 3 |
| Example 46A | 5 | 5 | 0 | 0 | 5 | 5 | 5 | 4 | 5 | 5 |
| Example 47A | 5 | 5 | 0 | 0 | 5 | 4 | 5 | 4 | 5 | 5 |
| Example 48A | 5 | 4 | 0 | 0 | 5 | 5 | 5 | 4 | 4 | 4 |
| Example 49A | 5 | 5 | 0 | 0 | 5 | 5 | 5 | 4 | 4 | 4 |
| Example 50A | 5 | 5 | 0 | 0 | 5 | 4 | 5 | 4 | 4 | 4 |
| Example 51A-1 | 4 | 4 | 0 | 0 | 4 | 4 | 5 | 4 | 3 | 3 |
| Example 52A-1 | 4 | 4 | 0 | 0 | 4 | 4 | 5 | 4 | 3 | 3 |
| Example 51A-2 | 4 | 4 | 0 | 0 | 4 | 4 | 5 | 4 | 4 | 4 |
| Example 52A-2 | 4 | 4 | 0 | 0 | 4 | 4 | 5 | 4 | 4 | 4 |
| Example 53A | 4 | 4 | 0 | 0 | 5 | 5 | 5 | 4 | 3 | 3 |
| Example 54A | 5 | 5 | 0 | 0 | 5 | 5 | 5 | 4 | 5 | 5 |
| Example 55A | 4 | 4 | 0 | 0 | 5 | 5 | 5 | 4 | 3 | 3 |
| Example 56A | 5 | 5 | 0 | 0 | 5 | 5 | 5 | 4 | 4 | 4 |
| Example 57A | 5 | 5 | 0 | 0 | 5 | 5 | 5 | 5 | 5 | 5 |
| Example 58A | 5 | 5 | 0 | 0 | 5 | 5 | 5 | 5 | 5 | 5 |
| Example 59A | 5 | 5 | 0 | 0 | 5 | 5 | 5 | 5 | 5 | 5 |
| Example 60A | 5 | 5 | 0 | 0 | 5 | 5 | 5 | 5 | 5 | 5 |

TABLE 9

| | Specific resin | | | | | | |
|---|---|---|---|---|---|---|---|
| | Constituent unit | | | | Mass ratio | | |
| | Constituent unit A | Constituent unit B1 | Constituent unit B2 | Terminal | Constituent unit A | Constituent unit B1 | Constituent unit B2 |
| Example 61A | (1-2) | (5-12) | (7-5) | (8-4) | 50 | 30 | 20 |
| Example 62A | (1-2) | (5-12) | (7-5) | (8-4) | 50 | 30 | 20 |
| Example 63A | (1-2) | (5-12) | (7-5) | (8-4) | 50 | 30 | 20 |
| Example 64A | (1-2) | (5-12) | (7-5) | (8-4) | 50 | 30 | 20 |
| Example 65A | (1-14) | (3-7) | — | (8-4) | 50 | 50 | 0 |
| Example 66A | (1-14) | (3-7) | — | (8-4) | 50 | 50 | 0 |
| Example 67A | (1-14) | (3-7) | — | (8-4) | 50 | 50 | 0 |
| Example 68A | (1-14) | (3-7) | — | (8-4) | 50 | 50 | 0 |
| Example 69A | (1-2) | (5-12) | (7-5) | (8-4) | 50 | 30 | 20 |
| Example 70A | (1-2) | (5-12) | (7-5) | (8-4) | 50 | 30 | 20 |
| Example 71A | (1-2) | (5-12) | (7-5) | (8-4) | 50 | 30 | 20 |
| Example 72A | (1-14) | (3-7) | — | (8-4) | 50 | 50 | 0 |
| Example 73A | (1-14) | (3-7) | — | (8-4) | 50 | 50 | 0 |
| Example 74A | (1-14) | (3-7) | — | (8-4) | 50 | 50 | 0 |
| Example 75A | (1-2) | (7-3) | — | (8-4) | 50 | 50 | 0 |
| Comparative Example 1 | — | — | — | — | — | — | — |
| Comparative Example 2 | (1-2) | (5-12) | (7-5) | (8-4) | 50 | 30 | 20 |
| Comparative Example 3 | (1-14) | (3-7) | — | (8-4) | 50 | 50 | 0 |

TABLE 9-continued

| | | | | (8-4) | 50 | 50 | 0 |
|---|---|---|---|---|---|---|---|
| Comparative Example 4 | — | — | — | (8-4) | 50 | 50 | 0 |
| Comparative Example 5 | — | — | — | — | — | — | — |

| | Specific resin | | | | | |
|---|---|---|---|---|---|---|
| | Amine value (mmol/g) | Mw | Content based on total amount of composition (mass %) | Amount of amine in 100 g of composition (mmol) | Photopolymerization initiator 1 | Photopolymerization initiator 2 |
| Example 61A | 3.18 | 10,000 | 3.0 | 9.5 | Irgacure 819 | Irgacure 184 |
| Example 62A | 3.18 | 10,000 | 3.0 | 9.5 | Irgacure 819 | Irgacure 184 |
| Example 63A | 3.18 | 10,000 | 3.0 | 9.5 | Irgacure 819 | Irgacure 184 |
| Example 64A | 3.18 | 10,000 | 3.0 | 9.5 | Irgacure 819 | Irgacure 184 |
| Example 65A | 2.09 | 10,000 | 3.0 | 6.3 | Irgacure 819 | Irgacure 184 |
| Example 66A | 2.09 | 10,000 | 3.0 | 6.3 | Irgacure 819 | Irgacure 184 |
| Example 67A | 2.09 | 10,000 | 3.0 | 6.3 | Irgacure 819 | Irgacure 184 |
| Example 68A | 2.09 | 10,000 | 3.0 | 6.3 | Irgacure 819 | Irgacure 184 |
| Example 69A | 3.18 | 10,000 | 3.0 | 9.5 | Irgacure 819 | Irgacure 184 |
| Example 70A | 3.18 | 10,000 | 3.0 | 9.5 | Irgacure 819 | Irgacure 184 |
| Example 71A | 3.18 | 10,000 | 3.0 | 9.5 | Irgacure 819 | Irgacure 184 |
| Example 72A | 2.09 | 10,000 | 3.0 | 6.3 | Irgacure 819 | Irgacure 184 |
| Example 73A | 2.09 | 10,000 | 3.0 | 6.3 | Irgacure 819 | Irgacure 184 |
| Example 74A | 2.09 | 10,000 | 3.0 | 6.3 | Irgacure 819 | Irgacure 184 |
| Example 75A | 3.18 | 10,000 | 3.0 | 9.5 | Irgacure 819 | Irgacure 184 |
| Comparative Example 1 | — | — | — | — | Irgacure 819 | Irgacure 184 |
| Comparative Example 2 | 3.18 | 10,000 | 3.0 | 9.5 | Irgacure 819 | Irgacure 184 |
| Comparative Example 3 | 2.09 | 10,000 | 3.0 | 6.3 | Irgacure 819 | Irgacure 184 |
| Comparative Example 4 | — | 10,000 | 3.0 | — | Irgacure 819 | Irgacure 184 |
| Comparative Example 5 | — | 10,000 | 3.0 | — | Irgacure 819 | Irgacure 184 |

| | Sensitizer | Antioxidant | Radical-polymerizable monomer having acid group | Amount of radical-polymerizable monomer having acid group in 100 g of composition (mmol) | Ink composition | Light source (Metal halide lamp) | |
|---|---|---|---|---|---|---|---|
| | | | | | | Blocking resistance | Scratch resistance |
| Example 61A | ITX | — | — | 0.000 | Ink 2 | 5 | 5 |
| Example 62A | ITX | — | — | 0.000 | Ink 3 | 5 | 5 |
| Example 63A | ITX | — | — | 0.000 | Ink 4 | 5 | 5 |
| Example 64A | ITX | — | — | 0.000 | Ink 5 | 4 | 4 |
| Example 65A | ITX | — | — | 0.000 | Ink 2 | 5 | 5 |
| Example 66A | ITX | — | — | 0.000 | Ink 3 | 5 | 5 |
| Example 67A | ITX | — | — | 0.000 | Ink 4 | 5 | 5 |
| Example 68A | ITX | — | — | 0.000 | Ink 5 | 4 | 4 |
| Example 69A | ITX | — | AES | 1.431 | Ink 1 | 5 | 4 |
| Example 70A | ITX | — | AES | 0.095 | Ink 1 | 5 | 5 |
| Example 71A | ITX | — | AES | 0.010 | Ink 1 | 5 | 5 |
| Example 72A | ITX | — | AES | 0.940 | Ink 1 | 5 | 4 |
| Example 73A | ITX | — | AES | 0.063 | Ink 1 | 5 | 5 |
| Example 74A | ITX | — | AES | 0.006 | Ink 1 | 5 | 5 |
| Example 75A | ITX | — | — | 0.000 | Ink 1 | 5 | 4 |
| Comparative Example 1 | ITX | — | — | 0.000 | Ink 1 | 1 | 1 |
| Comparative Example 2 | ITX | — | AES | 2.385 | Ink 1 | 2 | 2 |
| Comparative Example 3 | ITX | — | AES | 1.880 | Ink 1 | 2 | 2 |

TABLE 9-continued

| | | | | 0.000 | Ink 1 | 3 | 3 |
|---|---|---|---|---|---|---|---|
| Comparative Example 4 | ITX | — | — | 0.000 | Ink 1 | 3 | 3 |
| Comparative Example 5 | ITX | — | — | 0.000 | Ink 1 | 1 | 1 |

| | Light source (Metal halide lamp) | | | | | Light source (LED) | |
|---|---|---|---|---|---|---|---|
| | Adhesion | | Storage stability | Ejection stability | Glossiness | Yellowing | Blocking resistance | Scratch resistance |
| | PVC | Styrene | | | | | | |
| Example 61A | 0 | 0 | 5 | 5 | 5 | 4 | 5 | 5 |
| Example 62A | 0 | 0 | 5 | 5 | 5 | 4 | 5 | 5 |
| Example 63A | 0 | 0 | 5 | 5 | 5 | 4 | 5 | 5 |
| Example 64A | 0 | 0 | 5 | 5 | 5 | 4 | 3 | 3 |
| Example 65A | 0 | 0 | 5 | 5 | 5 | 4 | 4 | 4 |
| Example 66A | 0 | 0 | 5 | 5 | 5 | 4 | 4 | 4 |
| Example 67A | 0 | 0 | 5 | 5 | 5 | 4 | 4 | 4 |
| Example 68A | 0 | 0 | 5 | 5 | 5 | 4 | 3 | 3 |
| Example 69A | 0 | 0 | 5 | 5 | 4 | 4 | 5 | 4 |
| Example 70A | 0 | 0 | 5 | 5 | 5 | 4 | 5 | 5 |
| Example 71A | 0 | 0 | 5 | 5 | 5 | 4 | 5 | 5 |
| Example 72A | 0 | 0 | 5 | 5 | 4 | 4 | 5 | 4 |
| Example 73A | 0 | 0 | 5 | 5 | 5 | 4 | 5 | 5 |
| Example 74A | 0 | 0 | 5 | 5 | 5 | 4 | 5 | 5 |
| Example 75A | 0 | 1 | 5 | 4 | 5 | 4 | 4 | 3 |
| Comparative Example 1 | 5 | 5 | 4 | 5 | 1 | 5 | 1 | 1 |
| Comparative Example 2 | 4 | 5 | 1 | 1 | 1 | 3 | 1 | 1 |
| Comparative Example 3 | 4 | 5 | 1 | 1 | 1 | 3 | 1 | 1 |
| Comparative Example 4 | 3 | 3 | 4 | 4 | 1 | 2 | 2 | 2 |
| Comparative Example 5 | 5 | 5 | 1 | 1 | 1 | 1 | 1 | 1 |

Details of abbreviations in Tables 6 to 9 are described below.

The constituent units (1-2) to (8-15), etc. are the same as the above-described constituent units (1-2) to (8-15), etc.

IRGACURE 819: photopolymerization initiator manufactured by BASF, acylphosphine oxide compound, specifically, Bis(2,4,6-trimethylbenzoyl)phenylphosphine oxide IRGACURE 184: photopolymerization initiator manufactured by BASF, carbonyl compound, specifically, 1-Hydroxycyclohexylphenylketone IRGACURE 270: photopolymerization initiator manufactured by BASF, Triarylsulfonium hexafluorophosphate ITX: sensitizer, 2-Isopropylthioxanthone (manufactured by LAMB SON Limited)

BP: sensitizer, Benzophenone (manufactured by LAMBSON Limited)

TINUVIN 144: antioxidant manufactured by BASF, hindered amine compound, Di(1,2,2,6,6-pentamethyl-4-piperidyl)-2-butyl-2-(3,5-di-tert-butyl-4-hydroxybenzyl)malonate TINUVIN 123: antioxidant manufactured by BASF, hindered amine compound, Bis(2,2,6,6-tetramethyl-1-(octyloxy)-4-piperidinyl) sebacate AES: radical-polymerizable monomer having an acid group, 2-Acryloyloxyethyl succinate (manufactured by Kyoeisha Chemical Co., Ltd.)

As is apparent from the results in Tables 6 to 9, in the cases where the photo-curable ink compositions according to the present disclosure are used, images having good glossiness are obtained compared with the photo-curable ink compositions of Comparative Examples 1 to 5.

Furthermore, as is apparent from the results in Tables 6 to 9, the photo-curable ink compositions according to the present disclosure also have good storage stability and good election stability. In addition, the resulting images also have good blocking resistance, good scratch resistance, good adhesion, and a good property of suppressing yellowing.

As shown in Examples 1A to 5A and Examples 6A to 8A in Table 6, when the amine resin contains an amine resin including at least one constituent unit represented by the formula (1a) or the formula (2b) as the constituent unit A and at least one constituent unit represented by the formula (3) or the formula (4) as the constituent unit B or an amine resin including a constituent unit represented by the formula (1c) as the constituent unit A and at least one constituent unit represented by any of the formula (5) to the formula (7) as the constituent unit B, the images have better glossiness.

As shown in Example 8A and Examples 9A to 13A in Table 6, when the amine resin contains an amine resin including a constituent unit represented by the formula (1d) as the constituent unit A and at least one constituent unit represented by the formula (3) or the formula (4) as the constituent unit B, the resulting images have better scratch resistance.

As shown in Examples 16A, 19A, and 20A in Tables 6, when the amine resin contains an amine resin including a constituent unit represented by the formula (1c) as the constituent unit A and a constituent unit represented by the formula (5) and a constituent unit represented by the formula (6) or the formula (7) as the constituent unit B, the resulting image obtained by using the LED light source has better blocking resistance and scratch resistance.

As shown in Example 6A and Examples 14A to 16A in Table 6, when the amine resin contains an amine resin including, as the constituent unit B, a constituent unit represented by the formula (5) in which $Cy^{51}$ is a hydrocarbon group having a polycyclic structure having 3 to 15 carbon atoms, the resulting images have better blocking resistance and adhesion.

As shown in Examples 7A, 17A, and 18A in Table 6, when the amine resin contains an amine resin including, as the constituent unit B, a constituent unit represented by the formula (6) in which $R^{61}$ and $R^{62}$ are each independently a hydrocarbon group that has 1 to 4 carbon atoms and that may include an oxygen atom, the resulting images have better blocking resistance, adhesion, and ejection stability.

As shown in Example 75A in Table 9 and Example 19A in Table 6, when the amine resin contains an amine resin including a constituent unit represented by the formula (7a) as the constituent unit B, the resulting images have better blocking resistance, adhesion, and ejection stability.

As shown in Examples 9A, 20A, 23A, 25A, 26A, 27A, 29A, and 30A in Tables 6 and 7, when at least one terminal structure of the amine resin is a structure represented by the formula (8), the resulting images have better glossiness.

As shown in Examples 9A and 20A in Table 6 and in Examples 53A to 56A in Table 8, when a sensitizer, in particular, a thioxanthone compound or a carbonyl compound is contained, the resulting images have better blocking resistance and scratch resistance.

As shown in Examples 57A to 60A in Table 8, when an antioxidant, in particular, a hindered amine compound having a molecular weight of 1,000 or less is contained, the resulting images have a better property of suppressing yellowing.

As shown in Examples 9A and 20A in Table 6 and Examples 69A to 74A in Tables 9, when the content of a radical-polymerizable monomer having an acid group is 1% by mole or less relative to the number of moles of the amine moiety in the specific resin included in each of the photo-curable ink compositions, the resulting images have better scratch resistance.

The entire contents of the disclosure of Japanese Patent Application No. 2017-033902 filed on Feb. 24, 2017 are incorporated in the present specification by reference.

All documents, patent applications, and technical standards described herein are incorporated by reference in the present specification to the same degree as when individual documents, patent applications, and technical standards are incorporated by reference specifically and individually.

What is claimed is:

1. A photo-curable ink composition comprising:
    an amine resin including a constituent unit A represented by a formula (1) or a formula (2) and a constituent unit B represented by any of a formula (3) to a formula (7); and
    a radical-polymerizable monomer,
    wherein the radical-polymerizable monomer contains at least one of a monofunctional radical-polymerizable monomer or a bifunctional radical-polymerizable monomer,
    a total content of the monofunctional radical-polymerizable monomer and the bifunctional radical-polymerizable monomer is 50% by mass or more based on a total mass of the photo-curable ink composition, and
    in the radical-polymerizable monomer, a content of a radical-polymerizable monomer having an acid group is 1.5 mmol or less per 100 g of the photo-curable ink composition:

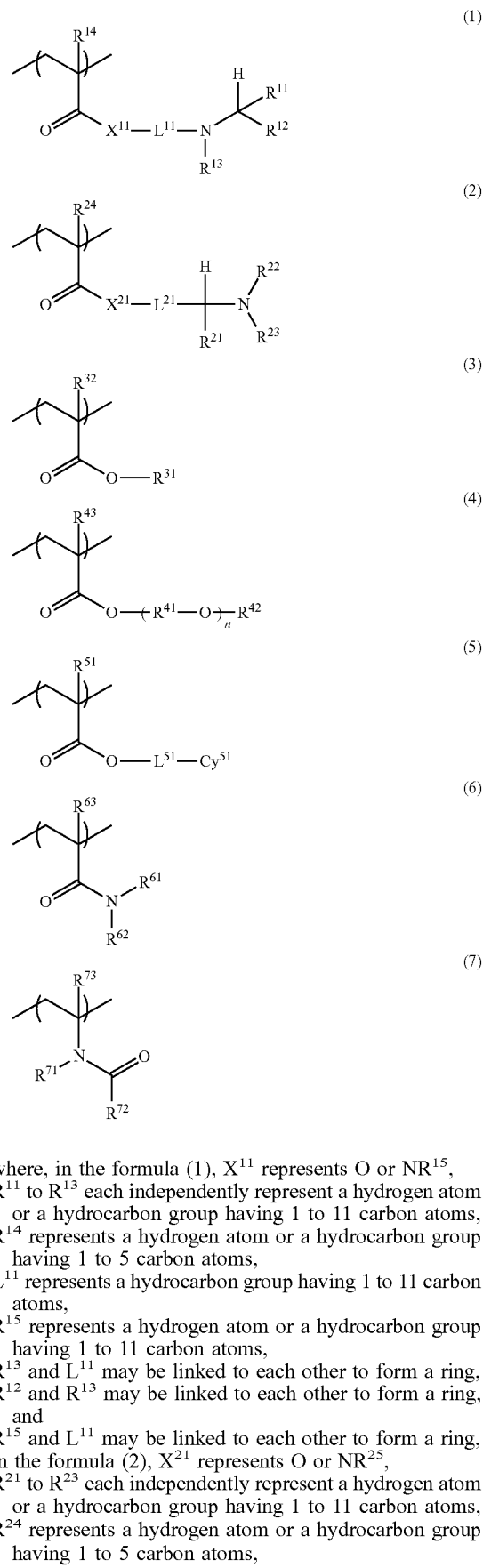

where, in the formula (1), $X^{11}$ represents O or $NR^{15}$,
$R^{11}$ to $R^{13}$ each independently represent a hydrogen atom or a hydrocarbon group having 1 to 11 carbon atoms,
$R^{14}$ represents a hydrogen atom or a hydrocarbon group having 1 to 5 carbon atoms,
$L^{11}$ represents a hydrocarbon group having 1 to 11 carbon atoms,
$R^{15}$ represents a hydrogen atom or a hydrocarbon group having 1 to 11 carbon atoms,
$R^{13}$ and $L^{11}$ may be linked to each other to form a ring,
$R^{12}$ and $R^{13}$ may be linked to each other to form a ring, and
$R^{15}$ and $L^{11}$ may be linked to each other to form a ring,
in the formula (2), $X^{21}$ represents O or $NR^{25}$,
$R^{21}$ to $R^{23}$ each independently represent a hydrogen atom or a hydrocarbon group having 1 to 11 carbon atoms,
$R^{24}$ represents a hydrogen atom or a hydrocarbon group having 1 to 5 carbon atoms, $L^{21}$ represents a hydrocarbon group having 1 to 11 carbon atoms, $R^{25}$ represents a hydrogen atom or a hydrocarbon group having 1 to 11 carbon atoms, $R^{21}$ and $L^{21}$ may be linked to each other to form a ring, $R^{22}$ and $R^{23}$ may be linked to each other to form a ring, and $R^{25}$ and $L^{21}$ may be linked to each other to form a ring, in the formula (3), $R^{31}$ represents a branched or unbranched hydrocarbon group having 1 to 11 carbon atoms, and $R^{32}$ represents a hydrogen atom or a hydrocarbon group having 1 to 5 carbon atoms, in the formula (4), $R^{41}$ at each occurrence independently represents a branched or unbranched hydrocarbon group having 1 to 10 carbon atoms, $R^{42}$ represents a hydrogen atom or a branched or unbranched hydrocarbon group having 1 to 10 carbon atoms, $R^{43}$ represents a hydrogen atom or a hydrocarbon group having 1 to 5 carbon atoms, and n represents an integer of 1 to 50, in the formula (5), $Cy^{51}$ represents a hydrocarbon group having a ring structure that has 3 to 15 carbon atoms and that may have an oxygen atom, $L^{51}$ represents a single bond or a divalent linking group, and $R^{51}$ represents a hydrogen atom or a hydrocarbon group having 1 to 5 carbon atoms, in the formula (6), $R^{61}$ and $R^{62}$ each independently represent a hydrogen atom or a hydrocarbon group that has 1 to 11 carbon atoms and that may include an oxygen atom, $R^{61}$ and $R^{62}$ may be linked to each other to have a ring structure, and $R^{63}$ represents a hydrogen atom or a hydrocarbon group having 1 to 5 carbon atoms, and in the formula (7), $R^{71}$ and $R^{72}$ each independently represent a hydrogen atom or a hydrocarbon group having 1 to 11 carbon atoms, $R^{71}$ and $R^{72}$ may be linked to each other to have a ring structure, and $R^{73}$ represents a hydrogen atom or a hydrocarbon group having 1 to 5 carbon atoms.

2. The photo-curable ink composition according to claim 1, wherein the amine resin includes an amine resin including at least one constituent unit represented by a formula (1a) or a formula (2b) as the constituent unit A and at least one constituent unit represented by the formula (3) or the formula (4) as the constituent unit B or an amine resin including a constituent unit represented by a formula (1c) as the constituent unit A and at least one constituent unit represented by any of the formula (5) to the formula (7) as the constituent unit B:

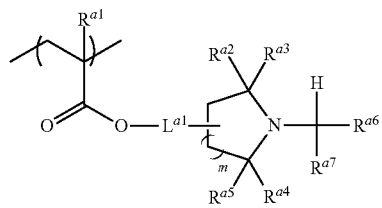

(1a)

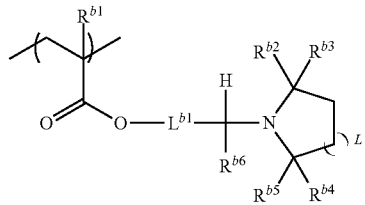

(2b)

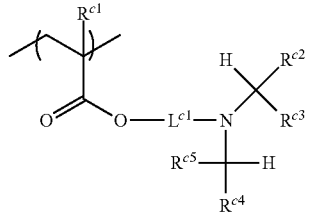

(1c)

where, in the formula (1a), $R^{a1}$ represents a hydrogen atom or a methyl group, $L^{a1}$ represents a single bond or a divalent hydrocarbon group having 1 to 11 carbon atoms, $R^{a2}$ to $R^{a5}$ each independently represent a hydrogen atom or a hydrocarbon group having 1 to 3 carbon atoms, $R^{a6}$ and $R^{a7}$ each independently represent a hydrogen atom or a hydrocarbon group having 1 to 10 carbon atoms, and m represents 1 or 2, in the formula (2b), $R^{b1}$ represents a hydrogen atom or a methyl group, $L^{b1}$ represents a single bond or a divalent hydrocarbon group having 1 to 11 carbon atoms, $R^{b2}$ to $R^{b5}$ each independently represent a hydrogen atom or a hydrocarbon group having 1 to 3 carbon atoms, $R^{b6}$ represents a hydrogen atom or a hydrocarbon group having 1 to 10 carbon atoms, and L represents 1 or 2, and in the formula (1c), $R^{c1}$ represents a hydrogen atom or a methyl group, $L^{c1}$ represents a divalent hydrocarbon group having 1 to 11 carbon atoms, and $R^{c2}$ to $R^{c5}$ each independently represent a hydrogen atom or a hydrocarbon group having 1 to 10 carbon atoms.

3. The photo-curable ink composition according to claim 1, wherein the amine resin includes an amine resin including a constituent unit represented by a formula (1d) as the constituent unit A and a constituent unit represented by the formula (3) or the formula (4) as the constituent unit B:

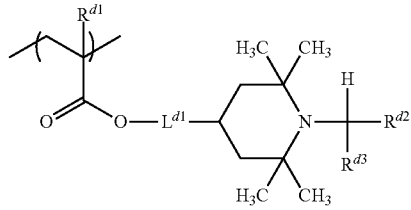

(1d)

where, in the formula (1d), R represents a hydrogen atom or a methyl group, $L^{d1}$ represents a single bond or a divalent hydrocarbon group having 1 to 11 carbon atoms, and $R^{d2}$ and $R^{d3}$ each independently represent a hydrogen atom or a hydrocarbon group having 1 to 3 carbon atoms.

4. The photo-curable ink composition according to claim 2, wherein the amine resin includes an amine resin including a constituent unit represented by the formula (1c) as the constituent unit A and a constituent unit represented by the formula (5) and a constituent unit represented by the formula (6) or the formula (7) as the constituent unit B.

5. The photo-curable ink composition according to claim 1, wherein $Cy^{51}$ in the formula (5) represents a hydrocarbon group having a polycyclic structure having 3 to 15 carbon atoms.

6. The photo-curable ink composition according to claim 1, wherein, in the formula (6), $R^{61}$ and $R^{62}$ each independently represent a hydrocarbon group that has 1 to 4 carbon atoms and that may include an oxygen atom, $R^{61}$ and $R^{62}$ may be linked to each other to have a ring structure, and $R^{63}$ represents a hydrogen atom or a methyl group.

7. The photo-curable ink composition according to claim 1, wherein the constituent unit represented by the formula (7) is a constituent unit represented by a formula (7a) below:

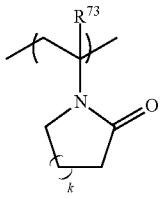

(7a)

where $R^{73}$ represents a hydrogen atom or a methyl group, and k represents an integer of 1 to 3.

8. The photo-curable ink composition according to claim 1, wherein at least one terminal structure of the amine resin is a structure represented by a formula (8):

$$R^{81}-S-* \qquad (8)$$

where, in the formula (8), $R^{81}$ represents a branched or unbranched hydrocarbon group having 8 to 20 carbon atoms, and * represents a site linked to the resin.

9. The photo-curable ink composition according to claim 1, wherein in the formula (3), $R^{31}$ represents a branched or unbranched hydrocarbon group having 1 to 4 carbon atoms, and in the formula (6), $R^{61}$ and $R^{62}$ each independently represent a hydrogen atom or an alkyl group having 1 to 3 carbon atoms.

10. The photo-curable ink composition according to claim 1, wherein the total content of the constituent unit A and the constituent unit B of the amine resin is 80% by mass or more with respect to the total mass of the amine resin.

11. The photo-curable ink composition according to claim 1, wherein the radical-polymerizable monomer having an acid group includes a radical-polymerizable monomer having a carboxy group.

12. A method for forming an image, comprising:

an application step of applying the photo-curable ink composition according to claim 1 to a recording medium by an ink jet method; and an irradiation step of irradiating the ink composition applied to the recording medium with an active energy ray.

* * * * *